US012641145B2

(12) United States Patent
Ramanathan et al.

(10) Patent No.: US 12,641,145 B2
(45) Date of Patent: May 26, 2026

(54) ARCHITECTURE FOR OFFERING A SERVICE OF A FIRST CLOUD SERVICE PROVIDER VIA A SECOND CLOUD SERVICE PROVIDER

(71) Applicant: Oracle International Corporation, Redwood Shores, CA (US)

(72) Inventors: Shyamsundar Ramanathan, Burlington, MA (US); Luke Francis Kearney, Seattle, WA (US); Aliaksei Petrovich Zayats, Woodstock, GA (US); Christopher Jared Tolton, Seattle, WA (US); Nikita Zheliakov, Jersey City, NJ (US); Sergei Korolev, New Port Richey, FL (US); Abhishek Kumar Sinha, Maple Grove, MN (US); Mostafa Gaber Mohammed Ead, West Vancouver (CA); Vladimir Chebotarev, Apex, NC (US); Kirils Zaicenko, Cumming, GA (US); Sarah Galler, Auburn, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/788,626

(22) Filed: Jul. 30, 2024

(65) Prior Publication Data
US 2025/0071169 A1     Feb. 27, 2025

Related U.S. Application Data

(60) Provisional application No. 63/608,036, filed on Dec. 8, 2023, provisional application No. 63/538,254, filed (Continued)

(51) Int. Cl.
*G06F 15/16* (2006.01)
*G06F 9/455* (2018.01)
(Continued)

(52) U.S. Cl.
CPC .......... *H04L 67/10* (2013.01); *G06F 9/45558* (2013.01); *G06F 9/5072* (2013.01); *H04L 41/0806* (2013.01); *G06F 2009/45595* (2013.01)

(58) Field of Classification Search
CPC ...................................................... G06F 9/5077
See application file for complete search history.

(56) References Cited

PUBLICATIONS

NPL, Max Jahn Blog, "Oracle Cloud (OCI) to Microsoft Azure Interconnect", Jun. 30, 2019 (Year: 2019).*

(Continued)

*Primary Examiner* — Padma Mundur
(74) *Attorney, Agent, or Firm* — Kilpatrick Townsend & Stockton LLP

(57) ABSTRACT

An architecture for offering a service of a first cloud service provider via a second cloud service provider is disclosed. A first cloud service provider infrastructure includes a first infrastructure and a second infrastructure. The first infrastructure is physically connected to a third infrastructure of a second cloud service provider infrastructure based on a first protocol. The first infrastructure is also physically connected to the second infrastructure based on a second protocol that is different from the first protocol. Using the first and second infrastructures, low latency high-bandwidth cross-cloud services can be provisioned and managed between private clouds of different cloud service providers.

20 Claims, 19 Drawing Sheets

Related U.S. Application Data on Sep. 13, 2023, provisional application No. 63/534,071, filed on Aug. 22, 2023.

(51) Int. Cl.
     *G06F 9/50*      (2006.01)
     *H04L 41/0806*   (2022.01)
     *H04L 67/10*     (2022.01)

(56)                References Cited

PUBLICATIONS

NPL, Atul Kumar, "Interconnect Microsoft Azure Expressroute with Oracle Cloud FastConnect", Jun. 24, 2021 (Year: 2021).*

Arif, How to setup the interconnect between Oracle Cloud Infrastructure and Microsoft Azure, Available Online at: https://medium.com/@j.jamalarif/how-to-setup-the-interconnect-between-oracle-cloud-infrastructure-and-microsoft-azure-da359233e5e9, Jun. 20, 2019, 22 pages.

Local VCN Peering using Local Peering Gateways, Available online at: https://docs.oracle.com/en-us/iaas/Content/Network/Tasks/localVCNpeering.htm, May 16, 2023, 8 pages.

Poonia et al., Step-by-Step Guide: Interconnecting Oracle Cloud Infrastructure and Microsoft Azure, Available online at: https://blogs.oracle.com/cloudmarketplace/post/step-by-step-guide-interconnecting-oracle-cloud-infrastructure-and-microsoft-azure, Jun. 11, 2020, 19 pages.

International Application No. PCT/US2024/040185, International Search Report and Written Opinion mailed on Nov. 20, 2024, 12 pages.

* cited by examiner

1400

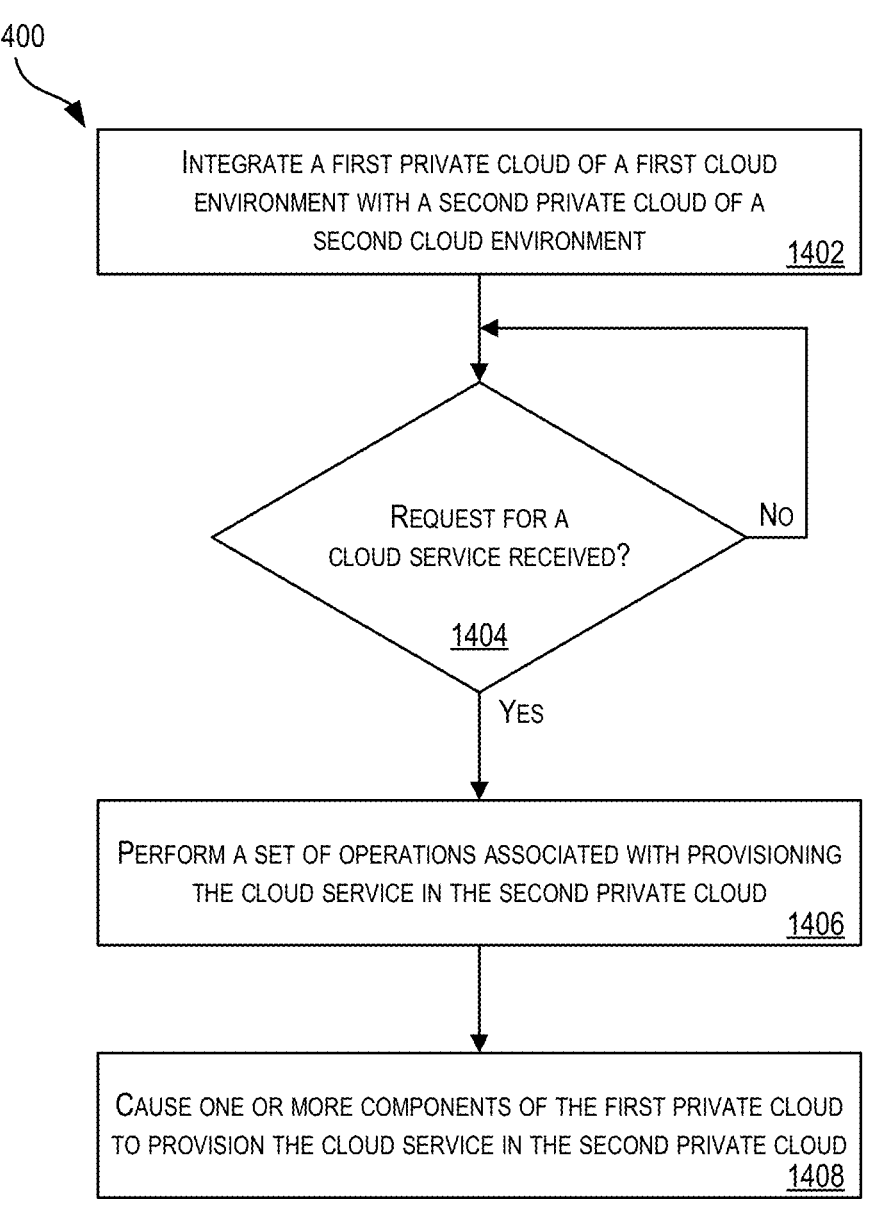

INTEGRATE A FIRST PRIVATE CLOUD OF A FIRST CLOUD
ENVIRONMENT WITH A SECOND PRIVATE CLOUD OF A
SECOND CLOUD ENVIRONMENT 1402

REQUEST FOR A
CLOUD SERVICE RECEIVED?

1404

No

YES

PERFORM A SET OF OPERATIONS ASSOCIATED WITH PROVISIONING
THE CLOUD SERVICE IN THE SECOND PRIVATE CLOUD
1406

CAUSE ONE OR MORE COMPONENTS OF THE FIRST PRIVATE CLOUD
TO PROVISION THE CLOUD SERVICE IN THE SECOND PRIVATE CLOUD
1408

*FIG. 14*

ARCHITECTURE FOR OFFERING A SERVICE OF A FIRST CLOUD SERVICE PROVIDER VIA A SECOND CLOUD SERVICE PROVIDER

CROSS-REFERENCE TO RELATED APPLICATIONS

The present application claims the benefit of and priority to U.S. Provisional Application No. 63/608,036, filed Dec. 8, 2023, to U.S. Provisional Application No. 63/538,254, filed Sep. 13, 2023, and to U.S. Provisional Application No. 63/534,071, filed Aug. 22, 2023, the entire contents of which are incorporated herein by reference for all purposes.

BACKGROUND

The last few years have seen a dramatic increase in the adoption of cloud services and this trend is only going to increase. Various different cloud environments are being provided by different cloud service providers (CSPs), each cloud environment providing a set of one or more cloud services. The set of cloud services offered by a cloud environment may include one or more different types of services including but not restricted to Software-as-a-Service (SaaS) services, Infrastructure-as-a-Service (IaaS) services, Platform-as-a-Service (PaaS) services, and others.

While various different cloud environments are currently available, each cloud environment provides a closed ecosystem for its subscribing customers. As a result, a customer of a cloud environment is restricted to using the services offered by that cloud environment. There is no easy way for a customer subscribing to a cloud environment provided by a CSP to, via that cloud environment, use a service offered provided by a different CSP. Embodiments discussed herein address these and other issues.

BRIEF SUMMARY

Disclosed herein is an architecture for offering a service of a first cloud service provider via a second cloud service provider.

In some embodiments, a system includes a first cloud service provider infrastructure includes a first infrastructure and a second infrastructure, wherein: the first infrastructure is physically connected to a third infrastructure of a second cloud service provider infrastructure based on a first protocol; and the first infrastructure is physically connected to the second infrastructure based on a second protocol that is different from the first protocol.

In some embodiments, the first cloud service provider infrastructure further includes a first connectivity fabric, and wherein the first connectivity fabric is physically connected to a second connectivity fabric of the second cloud service provider infrastructure such that data connectivity exists between the first infrastructure and the third infrastructure.

In some embodiments, a private cloud is hosted between the first infrastructure and the third infrastructure.

In some embodiments, the private cloud is a private cloud for a customer of a cloud service provider providing the first cloud service provider infrastructure.

In some embodiments, the private cloud is a first private cloud, and wherein a second private cloud is hosted between the first infrastructure and the second infrastructure.

In some embodiments, the second private cloud is a private cloud for a customer of a cloud service provider providing the first cloud service provider infrastructure.

In some embodiments, a first private cloud is interconnected to the second private cloud based on a physical connection between the first infrastructure and the second infrastructure, the first protocol, a physical connection between the first infrastructure and the third infrastructure, and the second protocol.

In some embodiments, the first private cloud utilizes computing resources provided by the first infrastructure and the third infrastructure.

In some embodiments, the second private cloud utilizes computing resources provided by the first infrastructure and the second infrastructure.

In some embodiments, the first private cloud is provided based at least in-part on executing services using one or more processors included in the first infrastructure.

In some embodiments, the first infrastructure includes a first set of routers and the second infrastructure includes a second set of routers, wherein the first set of routers are interconnected with the second set of routers.

In some embodiments, the first set of routers are interconnected with the second set of routers based on the first protocol.

In some embodiments, the first cloud service provider infrastructure is provided by a first cloud service provider and the second cloud service provider infrastructure is provided by a second cloud service provider that is different from the first cloud service provider.

In some embodiments, the first infrastructure and the second infrastructure are configured to provide a cross-cloud service of the second cloud service provider to a customer having a tenancy with the first cloud service provider.

In some embodiments, the first cloud service provider infrastructure is provided by a first cloud service provider and includes a set of computing resources that support cross-cloud services provided by a second cloud service provider providing the second cloud service provider infrastructure.

In some embodiments, the first protocol is a protocol supported by the second cloud service provider.

In some embodiments, the second protocol is a protocol supported by the first cloud service provider.

In some embodiments, the first infrastructure hosts a virtual machine cluster for a cross-cloud service provided by a second cloud service provider providing the second cloud service provider infrastructure.

In some embodiments, the first infrastructure supports a private cloud, and wherein the first infrastructure supports the private cloud based at least in part on a mapping of first subnets that are associated with the first infrastructure to second subnets associated with the third infrastructure.

In some embodiments, Internet Protocol (IP) addresses of the first subnets are within a Classless Inter-Domain Routing (CIDR) IP range of IP addresses of the second subnets.

BRIEF DESCRIPTION OF THE DRAWINGS

Features, embodiments, and advantages of the present disclosure are better understood when the following Detailed Description is read with reference to the accompanying drawings.

FIG. 14 depicts an example process for provisioning and managing cross-cloud services between multiple cloud environments, according to some embodiments.

DETAILED DESCRIPTION

Figure 1:
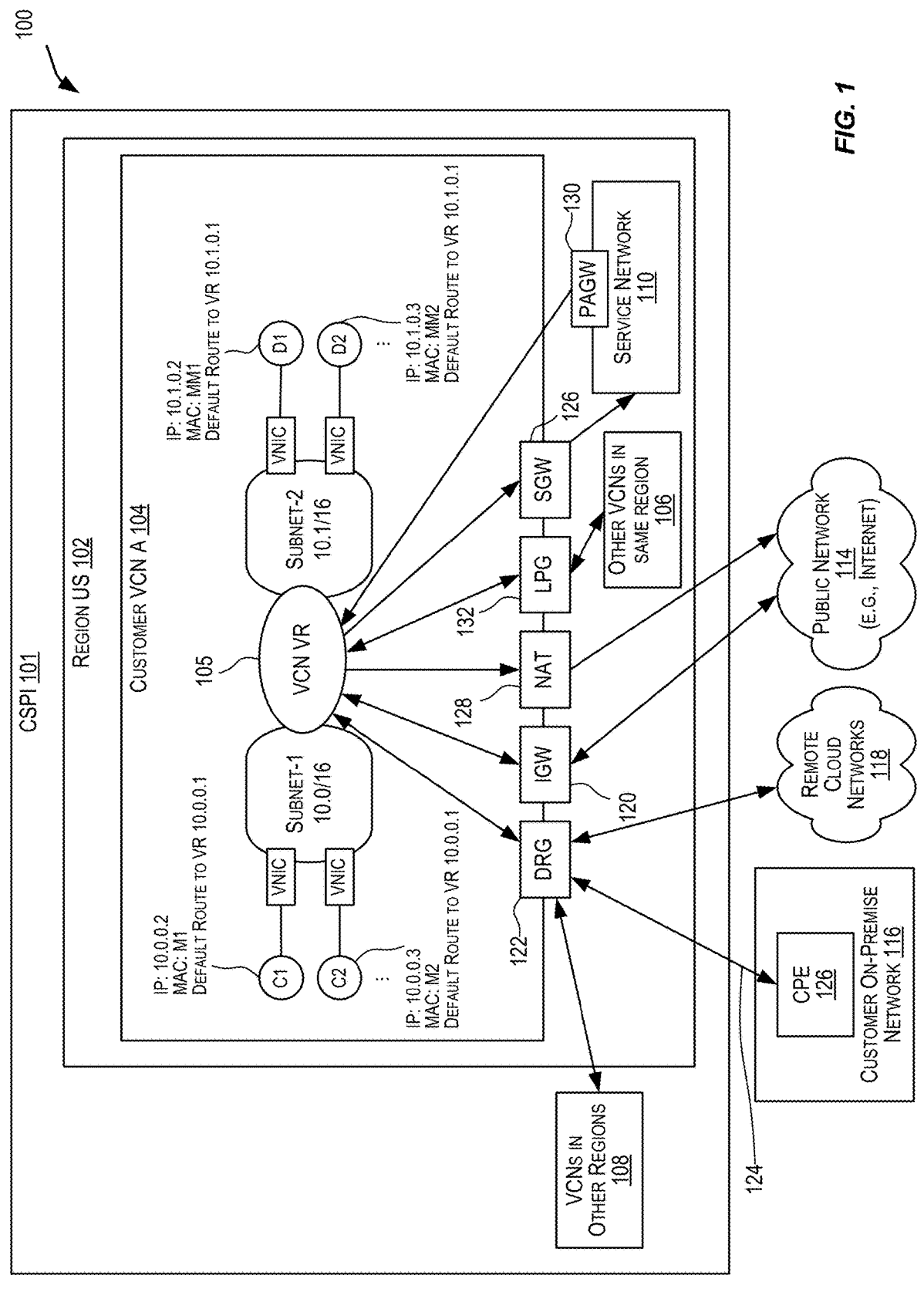
FIG. 1 is a high-level diagram of a distributed environment showing a virtual or overlay cloud network hosted by a cloud service provider infrastructure, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to improved cloud architectures, and more particularly to techniques for providing services based on infrastructure distributed between multiple cloud service providers (CSPs). In an example, a first cloud service provider (CSP) (e.g., Oracle® Cloud Infrastructure-OCI) provides first services (e.g., a database service, such as the Exadata service available from Oracle), some of which can be available from a first cloud service provider infrastructure (CSPI) of the first CSP. A second CSP (e.g., Microsoft® Azure, Google Cloud™, Amazon Web Services-AWS®) provides second services (e.g., Azure Virtual Machines), some of which can be available from a second cloud service provider infrastructure (CSPI) of the second CSP. At least a first service of the first services can be made available to customers of the second CSP via the second CSPI. In an example, hardware and/or software configured by the first CSPI to provide the first service are deployed at the second CSPI.

For example, at the physical level, the second CSPI can include a first set of computing resources of the first CSPI (e.g., a rack of servers optimized for a service of the first CSP). The first CSPI can include a second set of computing resources of the first CSPI (e.g., servers within a region). The second CSPI can also include a third set of computing resources of the second CSPI (e.g., servers within an availability zone). The first set of computing resources can be connected to the second set of computing resources and the third set of computing resources.

At the virtual level, the first set of resources and the second set of resource can host a first cloud for a customer with the first CSP. In comparison, the third set of resources can host a second cloud for the customer with the second CSP. The two clouds can be connected (e.g., via a peering connection that uses virtual routers). A service provided by the first CSP to the customer can have a first resource hosted in the first set of computing resources and a second resource hosted in the second set of computing resources. This service can be available to the customer via the second cloud. The use of the first resource enables the reduction of latency. The offering of the service of the first CSP via the second CSP can enable a better experience by extending the service to customers of the second CSP that may be more familiar with the configuring and managing of clouds with the second CSP.

To illustrate, consider the example of an Exadata service (i.e., an OCI database service) made available via Azure. In this example, at the physical level, an OCI child site belonging to an OCI region is co-located in an Azure data center. The OCI child site is connected to the Azure data center via a FastConnect router (and a Microsoft MeetMe ToR router at the Azure side). The OCI child site is also connected to the parent OCI region via a fiber optics connection. At the virtual level, the Azure data center hosts a customer cloud (e.g., VNET), whereas the OCI's parent region and child site collectively host a customer virtual cloud network (VCN). Latency critical resources for the OCI service (e.g., a data plane resource for the Exadata service) are hosted in the child site, whereas other supporting resources (e.g., a control plane resource, a customer facing console resource, etc.) are hosted in the parent region.

On the OCI side, the VNET and the VCN are connected via a virtual router (e.g., a dynamic routing gateway, DRG, that supports FastConnect and a virtual router provided by Azure that supports MeetMe). In the VNET, a delegate subnet can be configured. In the VCN, an Exadata service subnet can be configured. Both subnets use the same internet protocol (IP) address range. The VNET can store mapping information that maps an IP address that is within an IP address range and that is used in the VNET to an IP address of an Exadata service at the VCN. Traffic to the IP address (e.g., from a compute instance of the VNET) is sent from the VNET to the VCN given the one-to-one IP address mapping.

As such, from a customer perspective, the customer perceives an Exadata service within its VNET having an IP address. However, in effect this Exadata service is in the VCN at that IP address. Further, by hosting at least a part of the Exadata service in the child site (e.g., the data plane), the latency associated with the Exadata service can be reduced.

Referring back to the above architecture, the first set of computing resources can be referred to as belonging to a child site, whereas the second set of computing resources can be referred to as belonging to a parent site. The third set of computing resources can be referred to as data center resources. The child site of the first CSP is deployed in a data center (or the second CSPI) of the second CSP. In comparison, the parent site of the first CSP is deployed in the first CSPI of the first CSP.

A child site may enable low latency services of the first CSP to be offered to customers via the second CSP. However, a deployment mechanism may be needed to control deployment of resources of the first CSP in the child site and in the parent site.

Embodiments of the present disclosure relate to such a deployment mechanism. In an example, the deployment mechanism includes a control plane of the first CSP, where the control plane is not hosted in a child site. Customer input at the second CSPI can be received by the control plane and can mapped to a customer ID with the first CSPI. Based on the customer ID, the control plane can provision resources at the first CSPI, such as by creating a cloud network for the customer and related connectivity resources (e.g., a dynamic routing gateway DRG) for the cloud network. The cloud network can be also connected to a virtual machine (VM) cluster that would host the service. The VM cluster can be hosted in a child site, whereas other resources of the cloud network can be hosted in a parent site. Thereafter, the control plane can inter-connect the cloud network to the customer's cloud network with the second CSP, such that the two cloud networks of the customer are inter-connected. As part of this inter-connection, the control plane can provide internet protocol (IP) addresses of the VM cluster and, possibly, corresponding DNS records to the second CSPI such that these IP addresses, and possibly DNS records, are available to the customer at their cloud network with the second CSP.

To illustrate, consider again the example of OCI and Azure. Azure customer input (e.g., selecting their VNET and a subnet) is received from an Azure resource manager (ARM). Oracle Resource Provider (ORP) can transform this input into an OCI ID for the customer and pass this information to the control plane. The control plane performs two main processes. The first process is to provision the relevant OCI resources. The second process is to connect these resources to the customer's VNET.

Under the first process, the control plane creates the customer's VCN in a customer tenancy (e.g., at a parent site) and creates a subnet within the VCN (and possibly a backup subnet). The Azure and OCI subnets (one in the customer's Azure VNET and one in the customer's OCI VCN) use the same Classless Inter-Domain Routing (CIDR). The control plane also creates a DRG in the customer tenancy and attaches the DRG to the VCN. It also sets up the routing information for the DRG and the VCN (such that these two resources are inter-connected). ORP can also provision a VM cluster (e.g., in a child site). IP address(es) of this VM cluster from the CIDR and are mapped to corresponding DNS records.

Under the second process, the control plane registers these IP addresses with Azure (on the MeetMe router). It also creates a virtual circuit between the DRG and the MeetMe router and sends the DNS records such that a private DNS zone can be set up in Azure.

In the interest of clarity of explanation, embodiments of the present disclosure are described in connection with particular CSPs (e.g., Oracle and Microsoft) and services (e.g., an Exadata service). However, the embodiments are not limited as such and instead, similarly, and equivalently apply to any CSPs, CSPIs, and services in a multi-cloud environment.

Examples of Cloud Networks

The term cloud service is generally used to refer to a service that is made available by a CSP to users or customers on demand (e.g., via a subscription model) using systems and infrastructure (e.g., cloud infrastructure) provided by the CSP. Typically, the servers and systems that make up the CSP's infrastructure are separate from the customer's own on-premises systems and servers. Customers can thus avail themselves of cloud services provided by the CSP without having to purchase separate hardware and software resources for the services. Cloud services are designed to provide a subscribing customer easy, scalable access to applications and set of computing resources without the customer having to invest in procuring the infrastructure that is used for providing the services.

There are several cloud service providers that offer various types of cloud services. There are various different types or models of cloud services including Software-as-a-Service (SaaS), Infrastructure-as-a-Service (IaaS), Platform-as-a-Service (PaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, IaaS is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by the CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in a CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network (or substrate network or underlay network). The physical network provides the underlying basis for creating one or more overlay or virtual networks on top of the physical network. The physical network comprises physical network devices such as physical switches, routers, computers, host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a VCN. The virtual networks are implemented using software virtualization technologies (e.g., hypervisors, virtualization functions implemented by network virtualization devices (NVDs) (e.g., smartNICs), top-of-rack (ToR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)) Virtual Extensible LAN (VXLAN IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the CSPI provided by a CSP can be configured to provide virtualized set of computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by the CSPI to build one or multiple customizable and private virtual network(s) referred to as VCNs. A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by the CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, the CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's VCN. Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. The CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., VCNs, load balancing resources, connections to on-premise networks); database resources; edge networking resources (e.g., DNS); access management and monitoring resources; and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a VCN, or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, OCI currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as VCNs. A customer can set up one or more VCNs using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks or subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN.

Each compute instance is associated with a virtual network interface card (VNIC), that enables the compute instance to participate in a subnet of a VCN. A VNIC is a logical representation of a physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN control plane (CP). The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN CP, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by the VCN CP, and the launching of compute instances is handled by a compute CP. The compute CP is responsible for allocating the physical resources for the compute instance and then calls the VCN CP to create and attach VNICs to the compute instance. The VCN CP also sends VCN data mappings to a VCN data plane that is configured to perform packet forwarding and routing functions. In certain embodiments, the VCN CP provides a distribution service that is responsible for providing updates to the VCN data plane.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based services using CSPI are depicted in FIGS. 1-12 and 15-19 and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their VCNs. In certain embodiments, CSPI 101 offers IaaS services to subscribing customers. The data centers within CSPI 101 may be organized into one or more regions. One example region "Region US" 102 is shown in FIG. 1. A customer has configured a customer VCN c/o Oracle International Corporation for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VCN VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region, communications between a compute instance in Subnet-1 and an endpoint in service network 110 in the same region); or an endpoint in a VCN in a different region (e.g., communications between a compute instance in Subnet-1 and an endpoint in a VCN in a different region). A compute instance in a subnet hosted by CSPI 101 may also communicate with endpoints that are not hosted by CSPI 101 (i.e., are outside CSPI 101). These outside endpoints include endpoints in the customer's on-premises network 116, endpoints within other remote cloud networks 118, public endpoints 112 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premises network, then the packet may be forwarded by VCN VR 105 to DRG gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 15-18 (for example, gateways referenced by reference numbers 1534, 1536, 1538, 1634, 1636, 1638, 1734, 1736, 1738, 1834, 1836, and 1838) and described below. As shown in the embodiment depicted in FIG. 1, a DRG 122 may be added to or be associated with customer VCN 104 and provides a path for private network traffic communication between customer VCN 104 and another endpoint, where the other endpoint can be the customer's on-premises network 116, a VCN 108 in a different region of CSPI 101, or other remote cloud networks 118 not hosted by CSPI 101. Customer on-premises network 116 may be a customer network or a customer data center built using the customer's resources. Access to customer on-premises network 116 is generally very restricted. For a customer that has both a customer on-premises network 116 and one or more VCNs 104 deployed or hosted in the cloud by CSPI 101, the customer may want their on-premises network 116 and their cloud based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premises network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 112 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network

114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premises network to CSPI and its services. FastConnect provides an easy, elastic, and economical way to create a dedicated and private connection with higher bandwidth options and a more reliable and consistent networking experience when compared to Internet-based connections.

Figure 2:
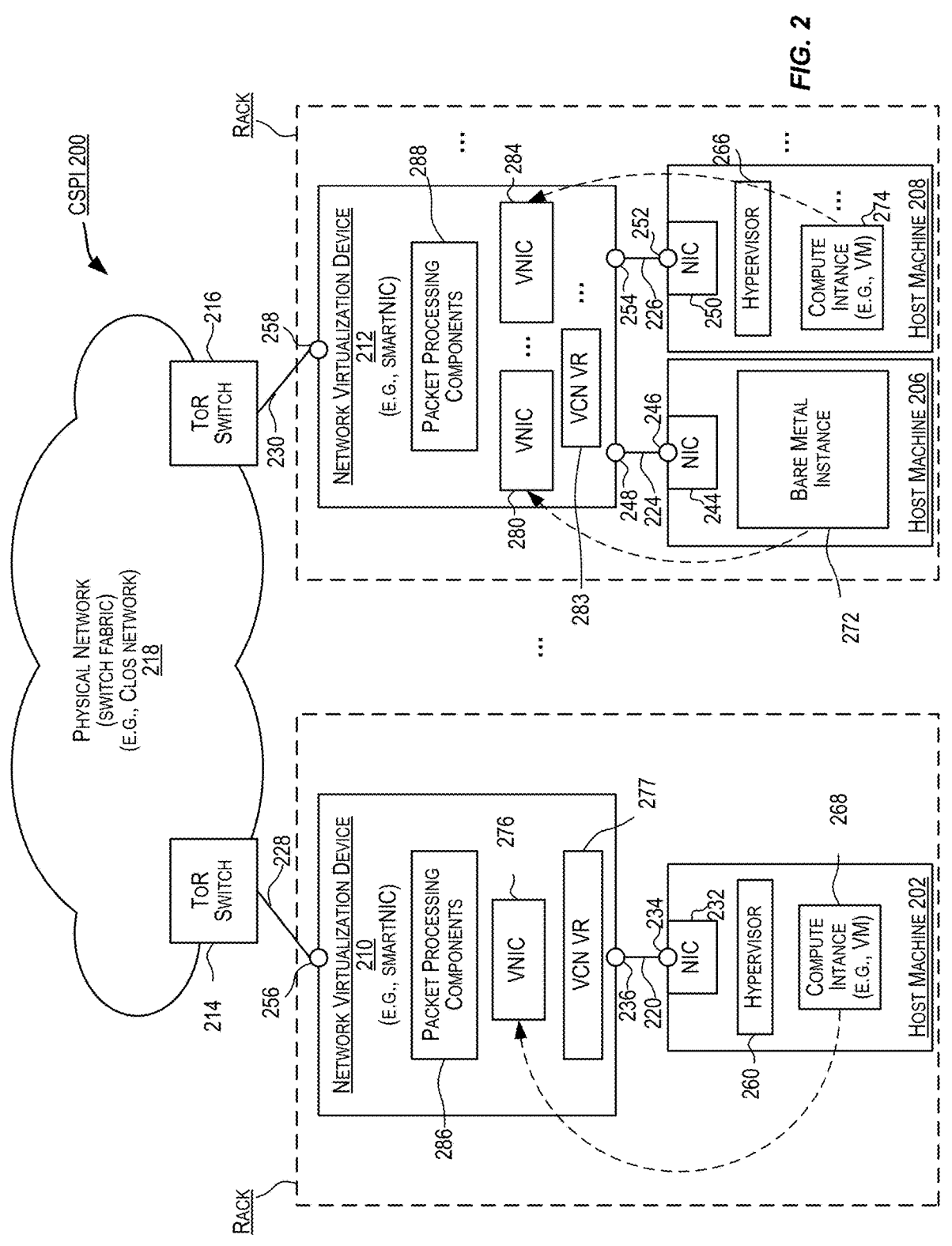
FIG. 2 depicts a simplified architectural diagram of the physical components in the physical network within a cloud service provider infrastructure (CSPI), according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a CSP. These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as VCNs. A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), ToR switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts, or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical set of computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical set of computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the set of computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same set of computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to ToR switches, which are connected to physical network 218 (also referred to as the switch fabric). In certain embodiments, the links between a host machine and an NVD, and between an NVD and a ToR switch are Ethernet links. For example, in FIG. 2, NVDs 210 and 212 are connected to ToR switches 214 and 216, respectively, using links 228 and 230.

In certain embodiments, the links 220, 224, 226, 228, and 230 are Ethernet links. The collection of host machines and NVDs that are connected to a ToR is sometimes referred to as a rack.

Figure 5:
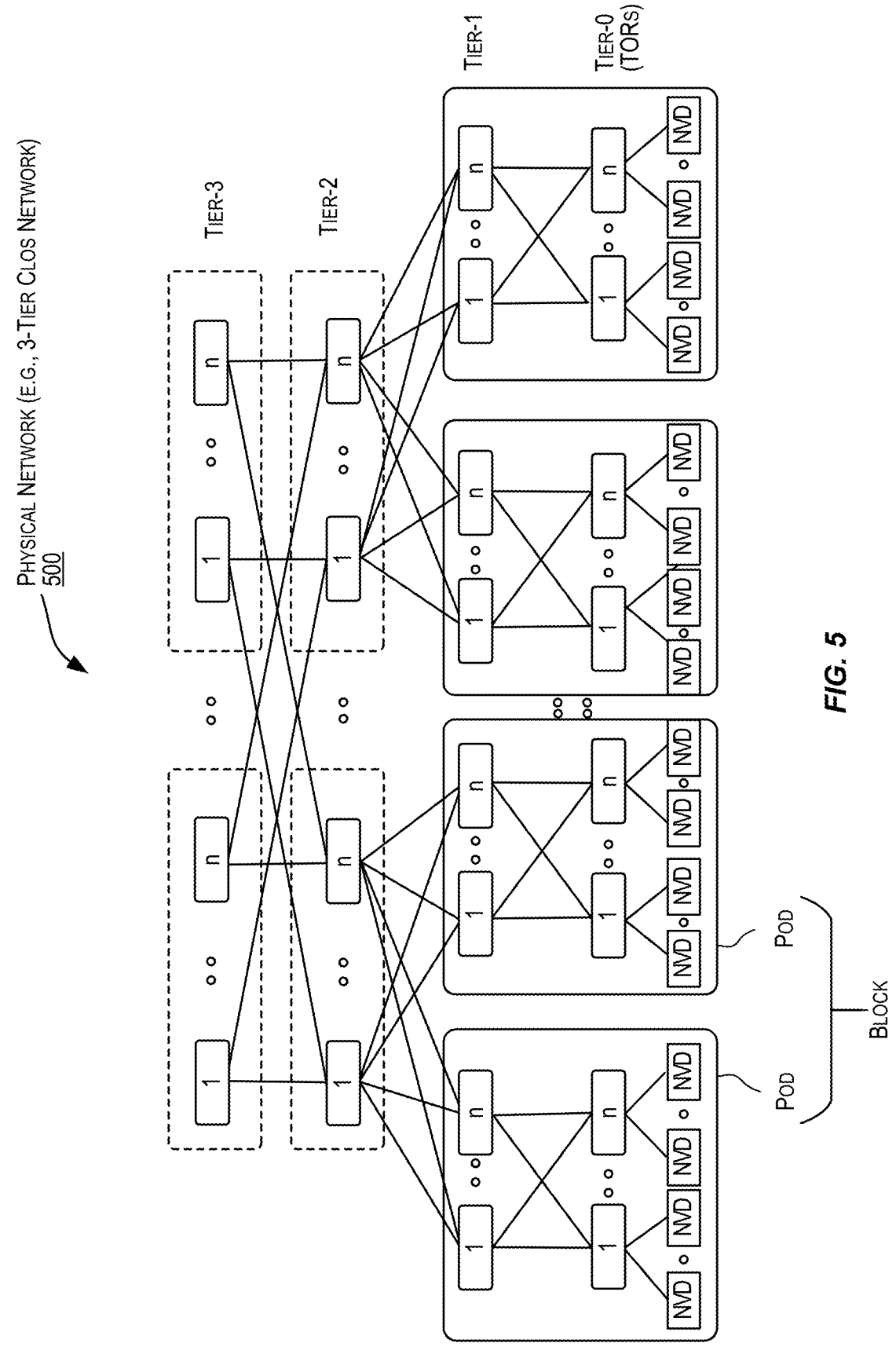
FIG. 5 depicts a simplified block diagram of a physical network provided by a CSPI, according to certain embodiments.

Physical network 218 provides a communication fabric that enables ToR switches to communicate with each other. Physical network 218 can be a multi-tiered network. In certain implementations, physical network 218 is a multi-tiered Clos network of switches, with ToR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
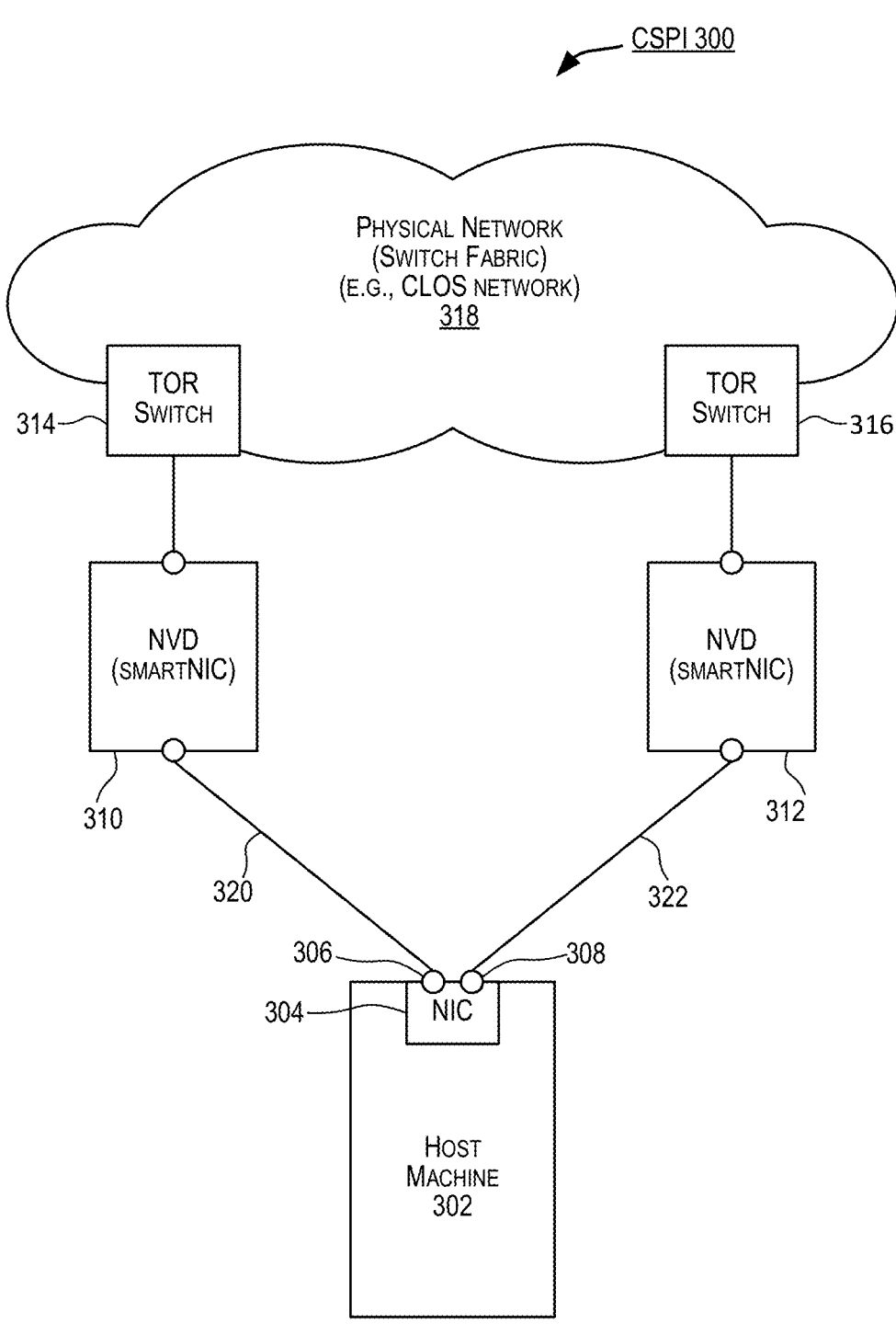
FIG. 3 shows an example arrangement within CSPI where a host machine is connected to multiple network virtualization devices (NVDs), according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first ToR switch 314 and NVD 312 is connected to a second ToR switch 316. The links between NVDs 310 and 312, and ToR switches 314 and 316 may be Ethernet links. ToR switches 314 and 316 represent the Tier-0 switching devices in multi-tiered physical network 318.

The arrangement depicted in FIG. 3 provides two separate physical network paths to and from physical switch network 318 to host machine 302: a first path traversing ToR switch 314 to NVD 310 to host machine 302, and a second path traversing ToR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more ToR switches, and other components of CSPI 200. For example, an NVD may be embodied in a host machine where the functions performed by an NVD are performed by the host machine. As another example, an NVD may be part of a ToR switch, or a ToR switch may be configured to perform functions performed by an NVD that enables the ToR switch to perform various complex packet transformations that are used for a public cloud. A ToR that performs the functions of an NVD is sometimes referred to as a smart ToR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more ToR switches. A port on an NVD can be classified as a host-facing port (also referred to as a "south port") or a network-facing or ToR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a ToR switch. Examples of network-facing ports in FIG. 2 include port 256 on NVD 210, and port 258 on NVD 212. As shown in FIG. 2, NVD 210 is connected to ToR switch 214 using link 228 that extends from port 256 of NVD 210 to the ToR switch 214. Likewise, NVD 212 is connected to ToR switch 216 using link 230 that extends from port 258 of NVD 212 to the ToR switch 216.

An NVD receives packets and frames from a host machine (e.g., packets and frames generated by a compute instance hosted by the host machine) via a host-facing port and, after performing the necessary packet processing, may forward the packets and frames to a ToR switch via a network-facing port of the NVD. An NVD may receive packets and frames from a ToR switch via a network-facing port of the NVD and, after performing the necessary packet processing, may forward the packets and frames to a host machine via a host-facing port of the NVD.

In certain embodiments, there may be multiple ports and associated links between an NVD and a ToR switch. These ports and links may be aggregated to form a link aggregator group of multiple ports or links (referred to as a LAG). Link aggregation allows multiple physical links between two endpoints (e.g., between an NVD and a ToR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a ToR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN CP are also depicted in FIGS. 15-18 (see references 1516, 1616, 1716, and 1816) and described below. Examples of a data plane VCN are depicted in FIGS. 15-18 (see references 1518, 1618, 1718, and 1818) and described below. The control plane functions include functions used for configuring a network (e.g., setting up routes and route tables, configuring VNICs, etc.) that controls how data is to be forwarded. In certain embodiments, a VCN CP is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. The VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN.

For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premises network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200 or are outside CSPI 200. Examples of these endpoints include endpoints within a customer's on-premises network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
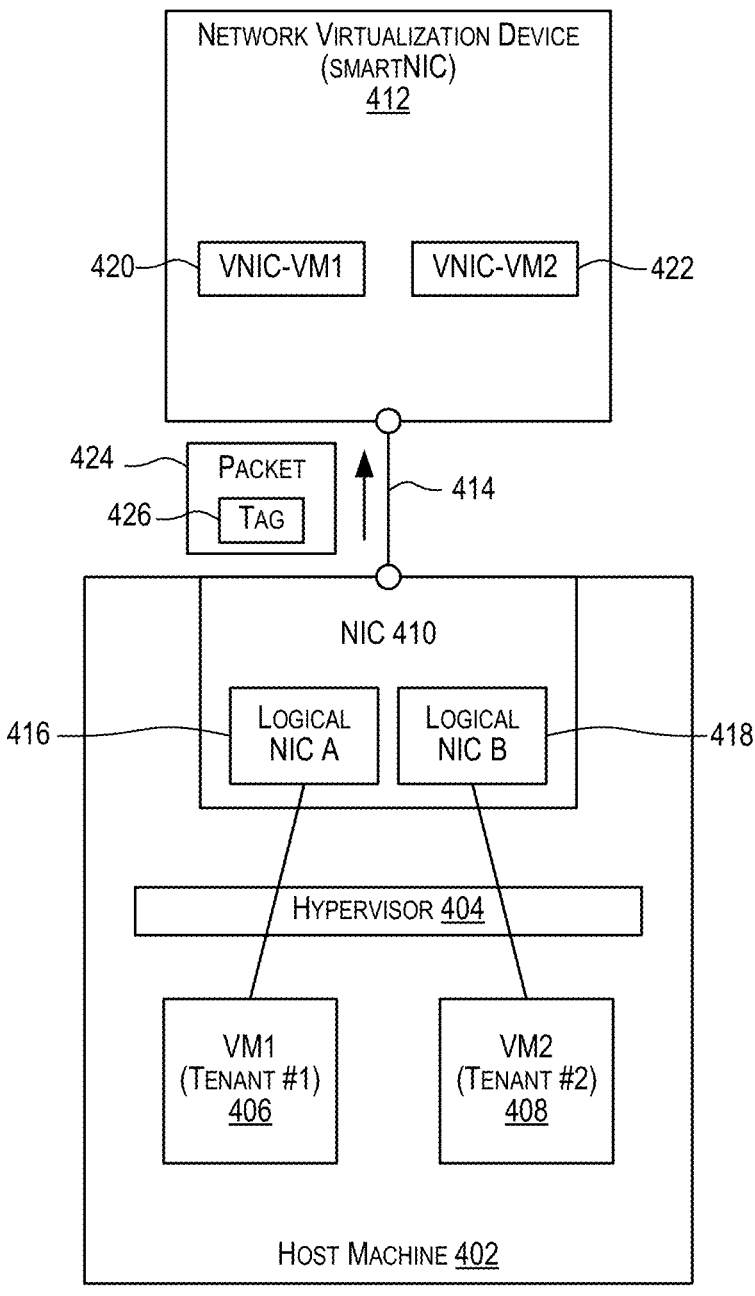
FIG. 4 depicts connectivity between a host machine and an NVD for providing I/O virtualization for supporting multitenancy, according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The ToR switches 504 represent Tier-0 switches in the Clos network. One or more NVDs are connected to the ToR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 ToR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE    TYPE>.<REALM>.[REGION] [.FUTURE USE].<UNIQUE ID> where, ocid1: The literal string indicating the version of the CID;

Resource Type: The type of resource (for example, instance, volume, VCN, subnet, user, group, and so on);

Realm: The realm the resource is in (Example values are "c1" for the commercial realm, "c2" for the Government Cloud realm, or "c3" for the Federal Government Cloud realm, etc. Each realm may have its own domain name);

Region: The region the resource is in (If the region is not applicable to the resource, this part might be blank);

Future use: (Reserved for future use); and unique ID: The unique portion of the ID (The format may vary depending on the type of resource or service).

Multi-Cloud

Figure 6:
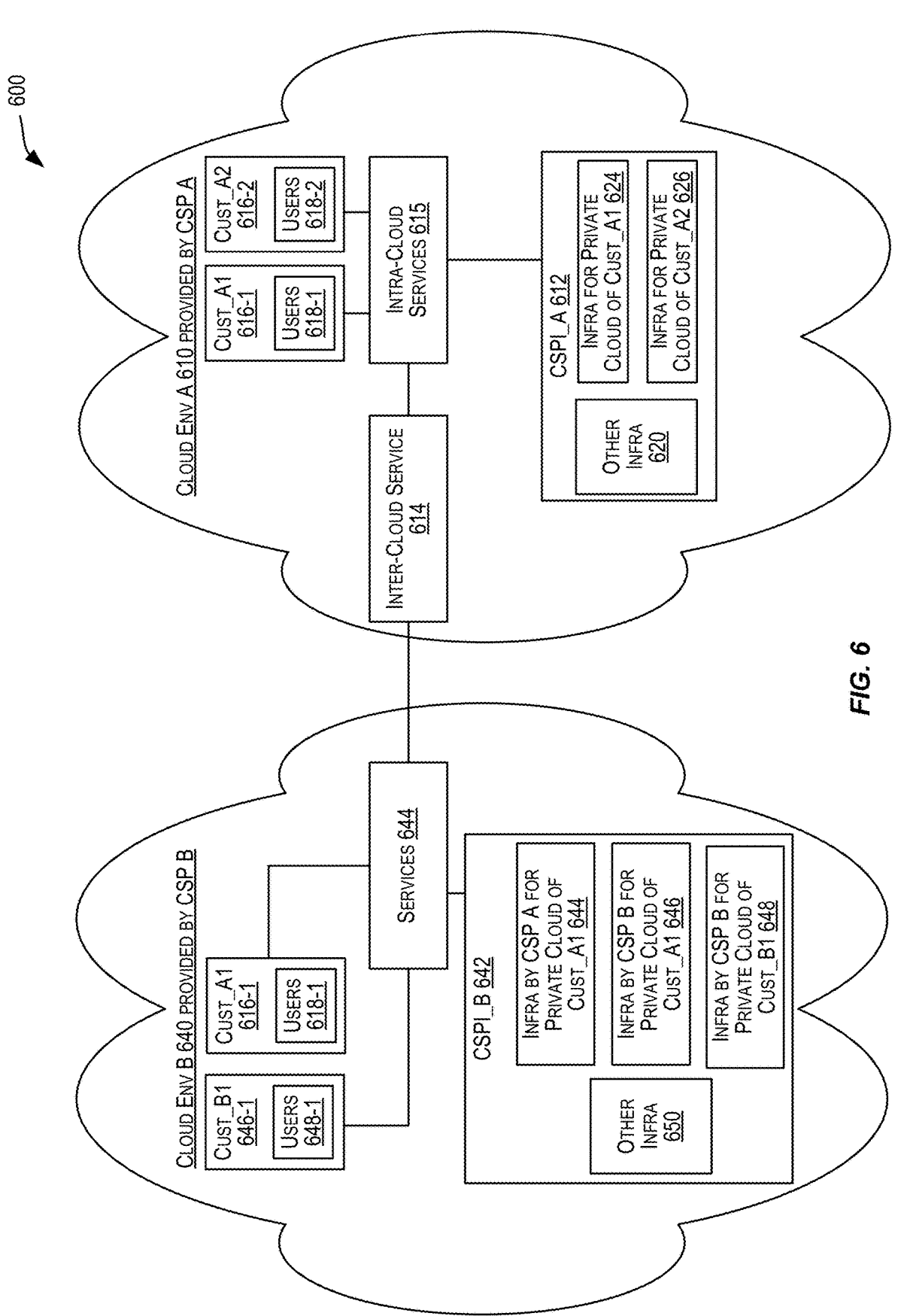
FIG. 6 depicts a simplified high-level diagram of a distributed environment comprising multiple cloud environments provided by different cloud service providers (CSPs), according to certain embodiments.

FIG. 6 depicts a simplified high-level diagram 600 of a distributed environment comprising multiple cloud environments provided by different CSPs. As depicted in FIG. 6, various cloud environments (also referred to as "clouds") may be provided by different CSPs, each cloud environment or cloud offering one or more cloud services that can be subscribed to by one or more customers of the corresponding CSP. The set of cloud services offered by a cloud environment provided by a CSP may include one or more different types of cloud services including but not restricted to SaaS services, IaaS services, PaaS services, Database-as-a-Service (DBaaS) services, and others. Examples of cloud environments provided by various CSPs include OCI, Azure, Google Cloud, AWS, and others. The cloud services offered by a particular cloud environment may be different from the set of cloud services offered by another cloud environment.

In a typical cloud environment, a CSP provides CSPI that is used to provide the set of cloud services that are offered by that cloud environment to its customers. The CSPI provided by a CSP may include various types of hardware and software resources including compute resources, memory resources, networking resources, consoles for accessing the cloud services, and others. A customer of a cloud environment provided by a CSP may subscribe to one or more of the cloud services offered by that cloud environment. Various subscription models may be offered by the CSP to its customers. After a customer subscribes to a cloud service provided by a cloud environment, one or more users may be associated with the subscribing customer and such users can use the cloud service subscribed to by the customer. In certain implementations, when a customer subscribes to a cloud service provided by a particular cloud environment, a customer account or customer tenancy is created for that customer. One or more users can then be associated with the customer tenancy and such users can then use the services subscribed to by the customer under the customer tenancy. Information regarding the services subscribed to by a customer, the users associated with the customer tenancy, etc., is usually stored within the cloud environment and associated with the customer tenancy.

For example, two different cloud environments provided by two different CSPs are depicted in FIG. 6 (although a different number of cloud environments is possible). These include a Cloud Environment A (cloud A) 610 provided by a CSP A and a Cloud Environment B (cloud B) 640 provided by a CSP B.

Cloud A 610 includes infrastructure CSPI_A 612 provided by CSP A. This infrastructure CSPI_A 612 may be used to provide a set of intra-cloud services 615 offered by cloud A 610. One or more customers (e.g., Cust_A1 616-1, Cust_A2 616-2) may subscribe to one or more of such services. One or more users 618-1 may be associated with customer Cust_A1 616-1 and can use the services subscribed to by customer Cust_A1 616-1 in cloud A 610. In a similar manner, one or more users 618-2 may be associated with customer Cust_A2 616-2 and can use the services subscribed to by customer Cust_A2 616-2 in cloud A 610. In various use cases, the services subscribed to by customer Cust_A1 616-1 may be different from the services subscribed to by customer Cust_A2 616-2.

Similarly, cloud B 640 includes infrastructure CSPI_B 642 provided by CSP B. This infrastructure CSPI_B 642 may be used to provide a set of services 644 offered by cloud B 640 (which may, but need not, be different from the services offered by Cloud A 610). One or more customers (e.g., Cust_B1 646-1) may subscribe to one or more services from the set of services 644. One or more users 648-1 may be associated with customer Cust_B1 646-1 and can use the services subscribed to by customer Cust_B1 646-1 in cloud B 640.

As depicted in FIG. 6, customer Cust_A1 616-1 is also a customer of CSP B and has subscribed to services available from CSPI_B 642. As such, customer Cust_A1 616-1 has tenancies in both cloud B 640 and cloud A 610.

In certain embodiments, CSP A and CSP B may agree to offer cross-cloud services of each. In the illustration of FIG. 6, CSP A offers one or more of its services to customers of CSP B via CSPI_B 642 (referred to herein as cross-cloud services). These cross-cloud services include, for example, database services, storage services, compute services, and the like. As such, customer Cust_A1 616-1 (customer of both clouds A and B) can request, subscribe, use, and/or manage one or more cross-cloud services of CSP A via its tenancy at CSPI_B 642. In comparison, customer Cust_B1 646-1 has no tenancy at CSPI_A 612. As such, cross-cloud services of CSP A may not be available to customer Cust_B1 646-1, unless customer Cust_B1 646-1 requests a tenancy to be provisioned with CSP A. This request can be submitted and managed via a portal of cloud B 640, as further described in the next figures.

To enable CSP A's cross-cloud services offering and availability via cloud B 640, cloud A 610 can implement an inter-cloud service 614. The inter-cloud service 614 can be configured to, among other things, enable the use of CSP A's cross-cloud services via cloud B. For example, the inter-cloud service 614 can communicate with services 644 of cloud B 640 and translate such communications into information suitable for use by intra-cloud services 615 of cloud A 610. More specifically, the set of services 644 can enable a portal of CSP B and the deployment and management of resources for a customer of CSP B within cloud B 640. Through this portal, a cross-cloud service of CSP A can be offered. Accordingly, a customer of CSP B (e.g., customer Cust_A1 616-1) can subscribe to and request the cross-cloud service of CSP A via the portal. Such subscription and cloud operation requests can be received by the inter-cloud service 614 that then translates them into information specific to cloud A 610. Such information can be passed to one or more of the intra-cloud services 615 that then provision the service. Information back from the intra-cloud services 615 can be translated and sent by the inter-cloud service 614 to cloud services 644 for use thereby.

In certain embodiments, the requested cross-cloud service can be provisioned by the one or more of the intra-cloud services 615 across resources in both cloud A 610 and cloud B 640. Doing so can support latency sensitive operations (or, at least, reduce processing latency).

As illustrated, infrastructure CSPI_A 612 of cloud A 610 includes an infrastructure 624 for a private cloud of customer Cust_A1 616-1 in cloud A 610 (e.g., for a VCN that is part of a tenancy of this customer at cloud A 610), an infrastructure 626 for a private cloud of customer Cust_A2 616-2 in cloud A 610, and other infrastructures 620. Each of these infrastructures includes hardware and/or software provided by CSP A and installed at locations (organized as regions) under the control of CSP A.

In comparison, infrastructure CSPI_B 642 of cloud B 640 includes an infrastructure 645 for the private cloud of customer Cust_A1 616-1 in cloud A (e.g., for the VCN that is part of the tenancy of this customer at cloud A 610), an infrastructure 646 for a private cloud of customer Cust_A1 616-1 in cloud B 640 (e.g., for a VNET that is part of this customer at cloud B 640), an infrastructure 648 for a private cloud of customer Cust_B1 646-1 in cloud B 640, and other infrastructures 650. The infrastructure 645 includes hardware and/or software provided by CSP A and installed at locations (organized as regions) under the control of CSP B (e.g., co-located with components of CSPI_B 642). In comparison, the infrastructures 646, 648, and 650 include hardware and/or software provided by CSP B and installed at locations (organized as regions) under the control of CSP B.

The infrastructure 645 and the infrastructure 646 can be networked together such that customer Cust_A1 616-1 can access, via its private cloud with CSP B, its private cloud with CSP A, where the private cloud with CSP A is distributed between CSPI_A 612 and CSPI_B 642. This communicative coupling of the private clouds can be initiated by the inter-cloud service 614 and performed by one or more of the intra-cloud services 615. In this way, customer A 616-1 has two tenancies: a first one with CSP A that includes a first private cloud (e.g., a VCN) distributed between CSPI_A 612 and CSPI_B 642, and a second one with CSP B that includes a second private cloud (e.g., VNET) local to CSPI_B 642.

The requested cross-cloud service can be actually hosted on the first private cloud (e.g., at least in part on the infrastructure 645 within CSPI_B 642 and, possibly, in the infrastructure 624 within CSPI_A 612) and accessible via the second private cloud (e.g., to workflows hosted by the infrastructure 646). This distribution of components to enable a first private cloud of a first CSP to be hosted, at least in part, by a second cloud of a second CSP and to be linked to a second private cloud hosted by the second cloud is further described in the next figures.

Figure 7:
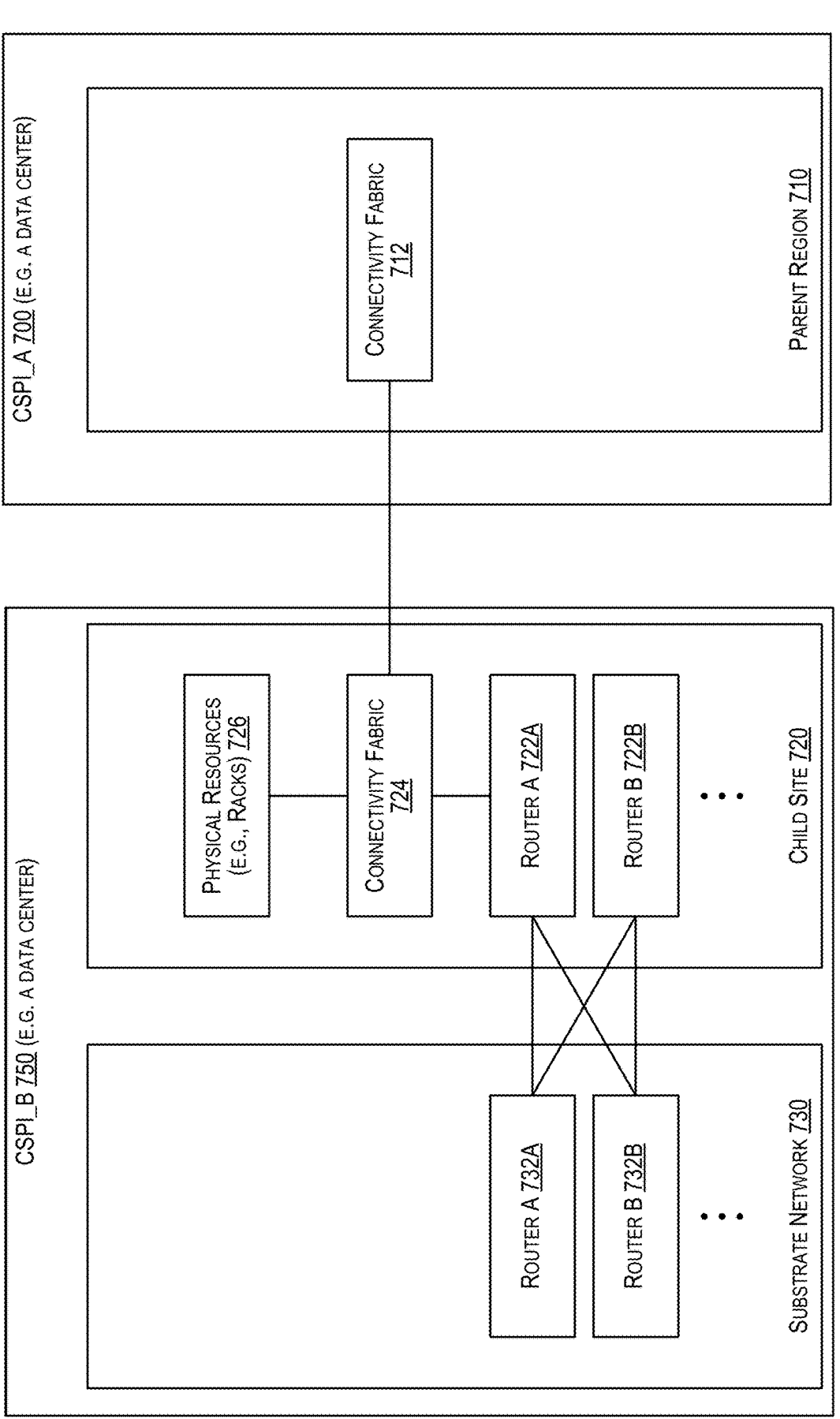
FIG. 7 depicts an exemplary physical architecture for providing a cross-cloud service based on infrastructure distributed between multiple CSPs, according to some embodiments.

FIG. 7 depicts an exemplary physical architecture for providing a cross-cloud service based on infrastructure distributed between multiple CSPs, according to some embodiments. In FIG. 7, a customer of a second CSP would manage the lifecycle of a cross-cloud service developed by a first CSP. For illustrative purposes, an Exadata service (which may also be referred to herein as Oracle DB service) and Oracle and Microsoft clouds are described. In this illustration, Oracle corresponds to the first CSP and Microsoft to the second CSP, whereas Exadata service corresponds to a cross-cloud service offered by the first CSP via a cloud of the second CSP. However, the embodiments are not limited as such and, instead, similarly apply to other CSPIs, CSPs and/or cross-cloud services.

A customer of the second CSP (e.g., an Azure customer) can create and manage, via a portal of the second CSP (e.g., an Azure portal), a virtual resource (e.g., an infrastructure and/or a VM cluster) within the cloud of the first CSP. This virtual resource can be provisioned to provide the cross-cloud service. The support of such offering can be implemented, at least in part, using the inter-cloud service 614 of FIG. 6. Further, the infrastructure supporting the virtual resource can be distributed between CSPIs of the two CSPs (e.g., between an Azure data center and an OCI region). In particular, a first portion of the infrastructure provided by the first CSP is installed at the CSPI of the second CSP, while a remaining, second portion of the infrastructure provided by the first CSP is installed at the CSPI of the first CSP. The first portion can be referred to as being included or forming a child site within the cloud of the second CSP. The second portion can be referred to as being included or forming a child parent region for the child site, where this parent region is within the cloud of the first CSP.

On the left side of FIG. 7, a second CSPI_B 750 of the second CSP is shown. This CSPI_B 750 can represent, for example, a data center of the second CSP (e.g., an Azure data center). Within the CSPI_B 750, a substrate network 730 is available and is provided by the second CSP. The substrate network 730 includes a set of computing resources, such as routers 732A, 732B, and so on (in the case of an Azure data center, these routers can include MeetMe ToRs that support the MeetMe protocol for connection peering). The CSPI_B 750 also includes the child site 720 (which is set of computing resources, such as server blades, racks, or other physical hardware of the first CSP executing software of the CSP). The child site 720 includes, among other things, routers 722A, 722B, and so on (in the case of OCI, these routers can include FastConnect routers that support the FastConnect protocol for connection peering), a connectivity fabric 724 (e.g., a physical fabric, such as JFAB, that provides connectivity to other physical fabrics and components) and physical resources 726 (e.g., racks, such as OCI server blades optimized for the cross-cloud service such that Exadata service).

On the right side of FIG. 7, a first CSPI_A 700 of the first CSP is shown. This CSPI_A 700 can represent, for example, a data center of the first CSP (e.g., an OCI data center). Within the CSPI_A 700, a parent region 710 is illustrated. The parent region 710 can include a substrate network having multiple components. Among these components is a connectivity fabric 712 (e.g., a physical fabric, such as JFAB). The connectivity fabric 712 is connected with the connectivity fabric 724 such that the child site 720 is communicatively coupled with the parent region 710. Optionally, the parent region 710 is within a region within physical proximity to the child site 720 (or, equivalently, the CSPI_B 750), such that network latency for communications between the child site 720 and the parent region 710 is reduced.

The routers 732 within the substrate network 730 can be interconnected (e.g., via Ethernet cables) to the routers 722 within the child site 720. The connectivity fabric 724 of the child site 720 provides inter-connectivity between the routers 722 and the physical resources 726. Further, this connectivity fabric 724 is connected (e.g., using fiber optics, such as Dark Fiber) with the connectivity fabric 714 of the parent region 710 such that a data connectivity can exist between the child site 720 and the parent region 710.

The substrate network 730 can host a set of resources of the second CSP for a customer (e.g., to provide a VNET that includes compute instances having access to the Exadata service, as further illustrated in the next figures). These second CSP resources can be part of a proximity group within a certain latency (e.g., 100 μs) to the cross-cloud service.

The child site 720 can host latency critical resources of the first CSP, where these first CSP resources support the cross-cloud service (e.g., the child site 720 can host OCI database resources and data plane resources in support of an Exadata service). The parent region 720 can host other resources (e.g., the inter-cloud service 614 and the intra-cloud services 715 of FIG. 6) that support the cross-cloud service (e.g., for the Exadata service, the parent region 720 can host ORP, OCI tooling, OCI metrics and logging, OCI control plane, regional OCI services, and a customer facing console). Some of these resources (e.g., the OCI database resources and data plane resources) can be deployed as part of a first private cloud of the customer with the first CSP (e.g., as a VCN in case of OCI) and can be perceived by the customer as being available to them via a second private cloud of the customer with the second CSP (e.g., a VNET in case of Azure). This perception is possible by using the same IP address range in the two private clouds for the cross-cloud service.

In an example, the customer can have multiple private clouds with each CSP (e.g., multiple VNETs and/or multiple VCNs). In the case of multiple private clouds with the first CSP, the underlying physical resources may not be co-located in the same CSPI of the second CSP and, instead, can be included in or form different child sites. In this case, these resources may not be directly interconnected (e.g., no direct physical connection may exist between the different child sites). Instead, an indirect connection can exist via parent region, where each of the different child sites is physically connected (e.g., via fiber optics) to the parent region, and where data flows between the two child sites through the parent region.

Further, the child site 720 can support a multi-tenancy architecture. In particular, multiple customers can each have one or more private clouds with each CSP (e.g., one or more VNETs and one or more VCNs). Each of such customers can have a separate access to a corresponding cross-cloud service via the child site 720.

Figure 8:
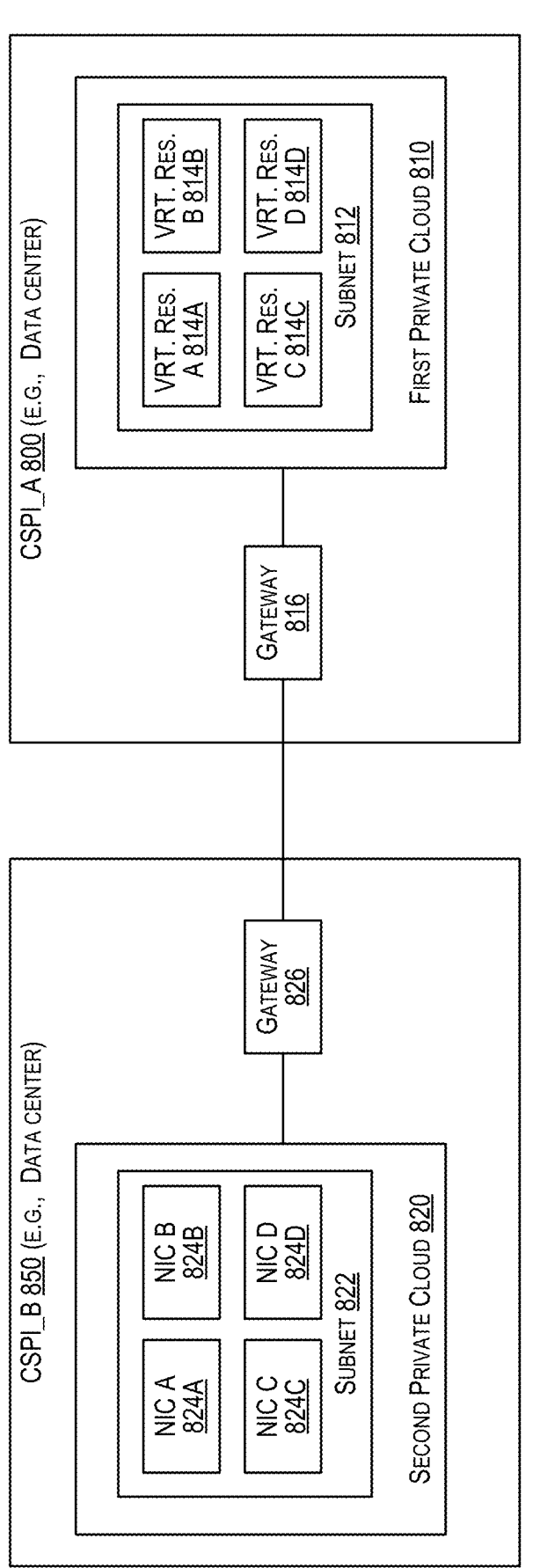
FIG. 8 depicts an exemplary virtual architecture for providing a cross-cloud service based on infrastructure distributed between multiple CSPs, according to some embodiments.

FIG. 8 depicts an exemplary virtual architecture for providing a cross-cloud service based on infrastructure distributed between multiple CSPs, according to some embodiments. In FIG. 8, a first private cloud 810 of a customer with a first CSP (e.g., a VCN hosted by OCI) and a second cloud 820 of the customer with a second CSP (e.g., VNET hosted by Azure) can be provisioned to provide a cross-cloud service of the first CSP via a cloud of the second CSP (e.g., an Exadata service offered by Oracle and available via Azure to an Azure customer).

In an example, the second private cloud 820 (e.g., VNET) is hosted by physical computing resources of CSPI_B 850 of the second CSP (e.g., an Azure data center). The second private cloud 820 can include compute instances (not shown) that have access to the cross-cloud service. The second private cloud 820 includes a subnet 822. The subnet 822 uses an IP address range. This range can be specified based on input of the customer via a portal of the second CSP (e.g., an Azure portal). An IP address can be allocated from the IP address range to each compute instance launched to provide the cross-cloud service for the customer (e.g., a VM that belongs to a VM cluster and that provides a database instance). These compute instances can be hosted by the first private cloud 810 (shown, more generally in FIG. 8, as virtual resources 814A, 814B, 814C, and 814D). In FIG. 8, four compute instances are illustrated and indicated with rectangles labeled NICs 824A, 824B, 824C, and 824D (or collectively NICs 824). Although a NIC stands for a network interface card, the NICs 824 of FIG. 8 are not as such per se. Instead, the NIC 824 represent mapping information to map each IP address to the corresponding compute instance of the cross-cloud service. This mapping information can be stored as part of the configuration information of the second private cloud 820. If a compute instance of the second private cloud 820 sends traffic or requests traffic using an IP address, and this IP address corresponds to a NIC, the mapping information indicates that the traffic is to be sent to or is to be received from the first private cloud 810 (e.g., the VCN) and is cross-cloud service traffic.

The first private cloud 810 (e.g., the VCN) can be hosted by physical computing resources of the first CSP including, for example, physical computing resources of a child site and a parent region (similar to the ones illustrated in FIG. 7). The first private cloud 810 can include a subnet 812 that uses the same IP address range. Each compute instance launched to provide the cross-cloud service (e.g., each of the virtual resources 814A, 814B, 814C, and 814D, collectively referred to as virtual resources 814) is hosted by a set of physical computing resources of the first CSP. The set for a compute instance can include a physical computing resource in the child site and a physical computing resource in the parent region. The child site's computing resource can include, for example, hardware (e.g., rack) executing software for the cross-cloud service as shown in FIG. 7 that provides latency critical virtual resources (e.g., database resources, data plane resources, etc.). The parent region's physical computing resource can include, for example, servers, server fleet, network virtualization devices, etc. that provide non-latency critical virtual resources (e.g., control plane resources, tooling resources, etc.).

Each compute instance can have an IP address from the IP address range. A one-to-one mapping exists between compute instances of the first private cloud 810 (e.g., the virtual resources 814) and the NICS 824 of the second private cloud 820. As such cross-cloud service traffic can be sent from the second private cloud 820 to the first private cloud 810 and vice versa using this one-to-one mapping.

The second private cloud 820 can be connected (e.g., peered) to the first private cloud 810 via one or more virtual routers (e.g., coupling a substrate network of the second CSP with the child site), gateways (e.g., to couple the child site with the parent region, a gateway 826 is implemented at the child site, and a gateway 816 is implemented at the parent region, such as by being parts of connectivity fabrics) and connection protocols (e.g., MeetMe and FastConnect protocols). Collectively, the gateways 816 and 826 can represent a dynamic routing gateway.

From a customer perspective, the customer need not be aware of the underlying physical architecture and interconnections. Instead, it may suffice that the customer can have visibility at the virtual level, whereby the customer can perceive and manage their private clouds 810 and 820 (e.g., their network configurations). Managing the second private cloud 820 can be via a second portal of the second CSP. Managing the first private cloud 810 can be via the second portal of the second CSP or a first portal of the first CSP. In an embodiment, changes and/or operations related to the cross-cloud service are only enabled via the second CSP (e.g., via the second CSP, the customer can scale up or down, remove, terminate, add, etc. virtual resources at the first private cloud 810 launched for the cross-cloud service). In comparison, change and/or operations unrelated to the cross-cloud service are enabled (possibly only) via the first CSP (e.g., via the first CSP, the customer can scale up or down, remove, terminate, add, etc. virtual resources at the first private cloud 810 launched for a non-cross-cloud service).

Figure 9:
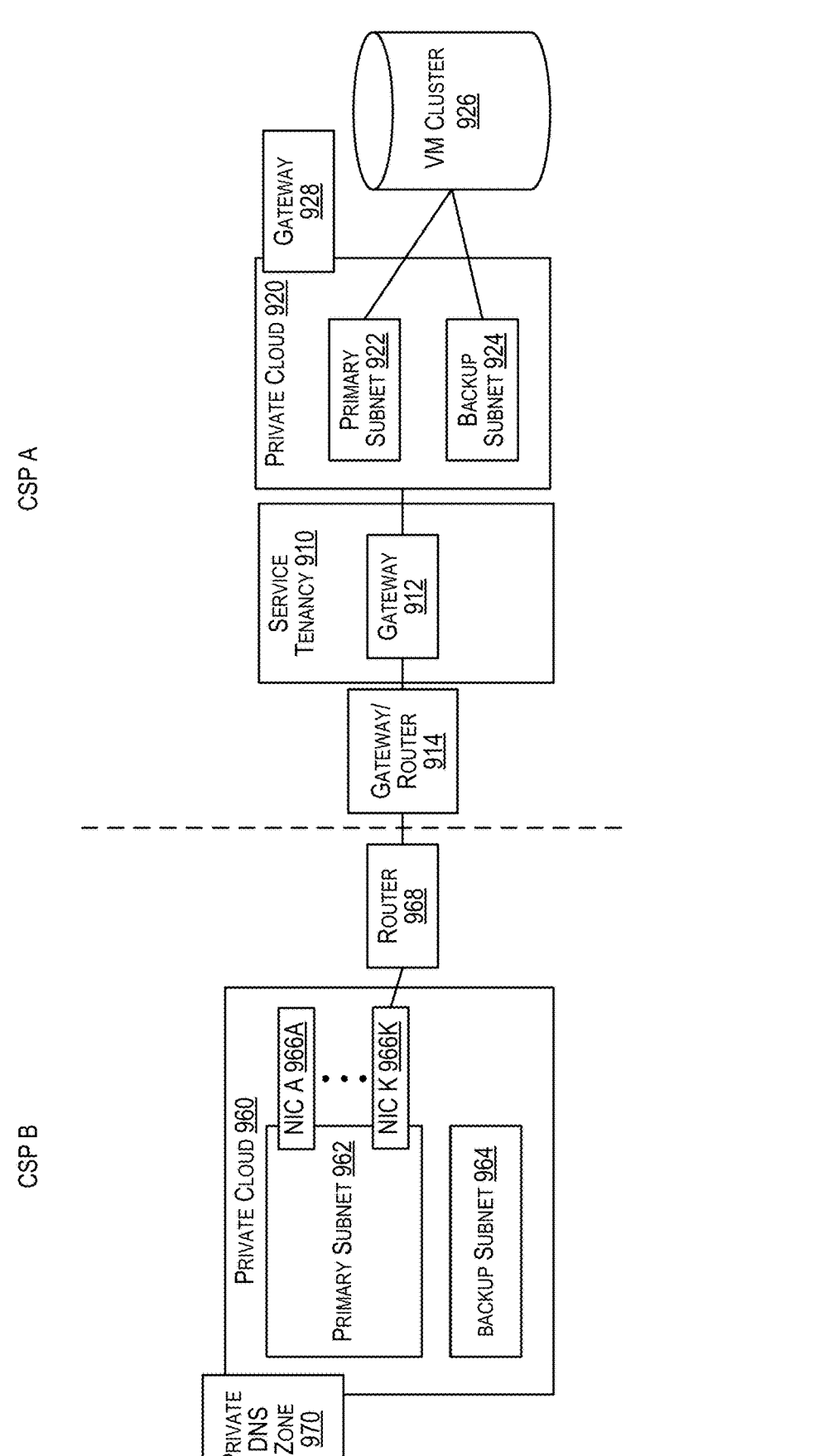
FIG. 9 depicts exemplary virtual resources provisioned by a first CSP for a customer of a second CSP, according to some embodiments.

FIG. 9 depicts exemplary virtual resources provisioned for a customer, according to some embodiments. The right side of FIG. 9 shows first resources of a first CSP (e.g., OCI resources) deployed for a customer. The left side of FIG. 9 shows second resources of a second CSP (e.g., to an Azure data center) deployed for the customer. The first CSP (shown as CSP A) provides a cross-cloud service (e.g., an Exadata service) available via a cloud of the second CSP (shown as CSP B).

The first resources (which can be a combination of physical and virtual resources) can include a private cloud 920, a service tenancy 910, a VM cluster 926, and a gateway 928. The private cloud 920 (e.g., a VCN) can correspond to a tenancy of the customer with the first CSP and can include a primary subnet 922 having an IP range (e.g., Classless Inter-Domain Routing (CIDR) range) and, optionally, a backup subnet 924 using the same IP range. The service tenancy 910 can be available for multiple customers of the first CSP and can include a gateway 912. The VM cluster 926 includes a number of VMs (or compute instances) launched for the client to provide thereto the cross-cloud service. The VM cluster 926 can be hosted on physical resources within a child site. The gateway 928 (e.g., a service gateway) connects virtual resources of the primary subnet 922 (and, likewise of the backup subnet 924) that are hosted on physical resources within a parent region with the VM cluster 926. In comparison, the gateway 912 connects such virtual resources to a private cloud 960 of the customer with the second CSP. The gateway 912 can be implemented as a DRG attached to the private cloud 920 in the customer tenancy. The connection can be via a gateway/router 914. The gateway/router 914 can provided, at least in part, in a child site and connect the child site to a parent region (thus, providing gateway functionalities) via a first connection protocol (e.g., FastConnect) and connect the child site to a substrate network of the second CSP (thus, providing routing functionalities) via a second connection protocol (e.g., MeetMe). For example, the gateway/router 914 can represent a FastConnect Virtual Circuit resource in the service tenancy 910 to connect the DRG to an Azure MeetMe router (an example of a router 968).

The second resources (which can be a combination of physical and virtual resources) can include the private cloud 960 and the router 968. The private cloud 960 can include a primary subnet 922 having an IP range and, optionally, a backup subnet 964 using the same IP range. The IP range can be the same as the one of the primary subnet 922. The router 968 can be connected to the gateway/router 914 such that to provide a data connection from the primary subnet 962 (e.g., and the backup subnet 964) to the private cloud 920. The primary subnet 962 can include NICs 966A through 966K that are connected to the router 968.

The IP addresses used for the different virtual resources to provide the cross-cloud service can be selected by the first CSP (e.g., by an inter or intra-cloud service thereof) from the IP range. The first CSP (e.g., The inter or intra-cloud service thereof) can create domain name system (DNS) corresponding to the IP addresses and can be provided to the private cloud 960. Such DNS record can be used to set up a private DNS zone for the customer, where this private DNS zone can be used with the private cloud 960.

To illustrate, the subnets 922, 924, 962, 964 use IP addresses from 10.0.10.0/24. Each NIC 966 has an IP address from this range (e.g., NICA 966 A uses 10.0.10.10, NIC K 966 K uses 10.0.10.11). The VMs in the VM clusters use the same IP addresses (e.g., a first VM uses 10.0.10.10, whereas a second VM uses 10.0.10.11).

Figure 10:
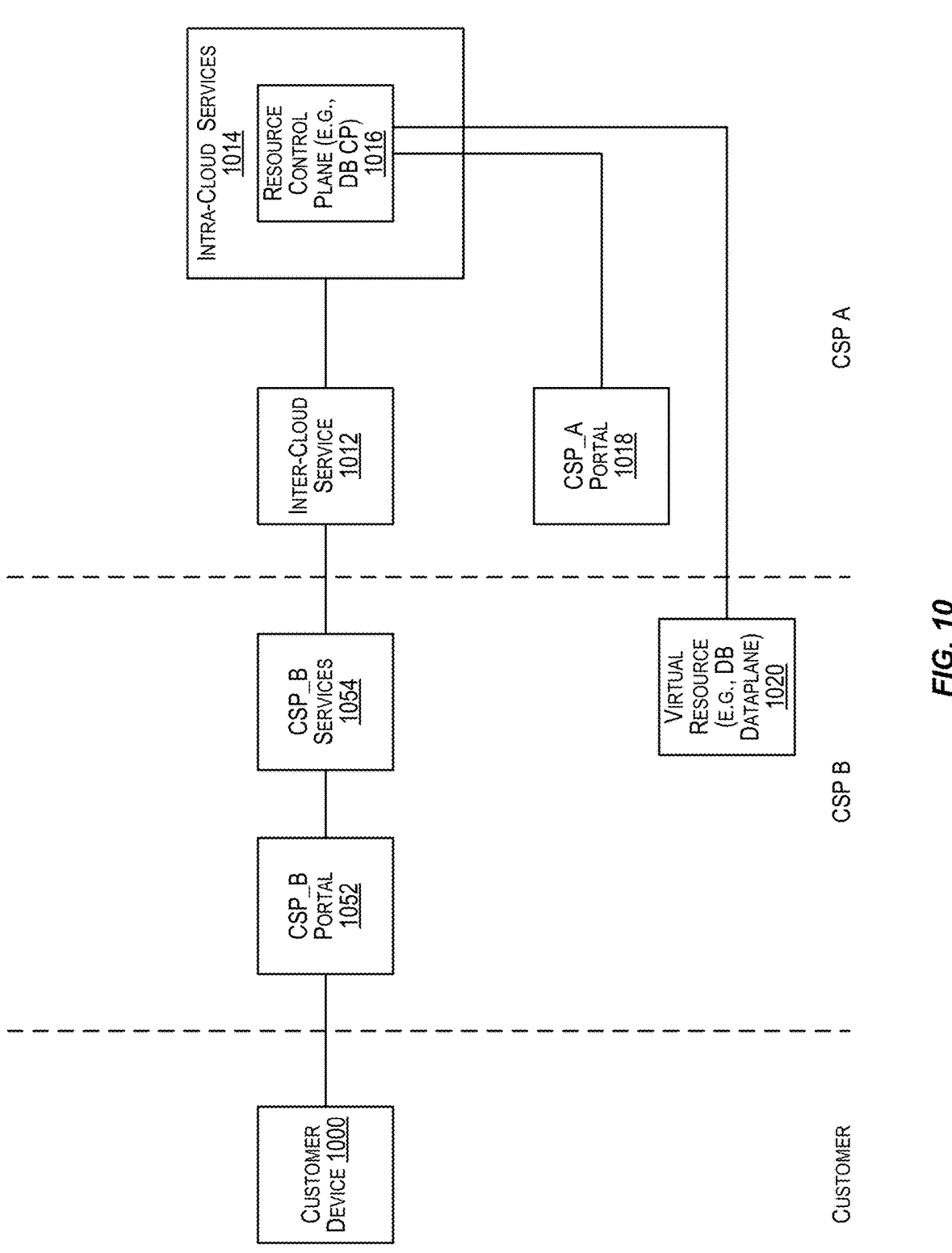
FIG. 10 depicts an exemplary architecture for provisioning and managing a cross-cloud service based on an infrastructure distributed between multiple CSPs, according to some embodiments, according to some embodiments.

FIG. 10 depicts an exemplary architecture for provisioning and managing a cross-cloud service based on an infrastructure distributed between multiple CSPs, according to some embodiments. In FIG. 10, a customer of a second CSP (shown as a CSP B) would manage the lifecycle of a cross-cloud service developed by a first CSP (shown as CSP A). In the interest of clarity and for illustrative purposes, OCI and Azure are described as examples of CSPIs, and Exadata service is described as an example of the cross-cloud service. However, the embodiments are not limited as such and, instead, similarly apply to other CSPs and/or cross-cloud services.

A customer (e.g., an Azure customer) can operate a customer device 1000 to create and manage a set of virtual resources for the cross-cloud service (e.g., an Oracle DB Infrastructure resources) via a portal of the second CSP (shown as a CSP_B Portal 1052). In an example, this portal 1052 interacts with one or more services of the second CSP (shown as CSP_B services 1054, examples thereof can include an Azure resource manager (ARM) which exposes APIs to manage the lifecycle of Oracle DB Infrastructure resources (DB Infrastructure resources include Exadata Infrastructure and Cloud VM Cluster); other examples include Azure Resource Provider as a Service (RPaaS) to simplify development and operation of an Azure Resource Provider, such as asynchronous operations and their progress updates). To manage resources built on top of set of virtual resources (DB Home, Database, Pluggable Database), the CSP_B services 1054 interact with an inter-cloud service 1012 of the first CSP such that the customer is redirected to the inter-cloud service 1012 (e.g., ORP in the case of OCI).

The inter-cloud service 1012 is configured to: i. handle translation of identifiers assigned by the second CSP (e.g., Azure identifiers) to identifiers assigned by the first CSP (e.g., OCI identifiers) including identities, resource IDs, and subscription IDs; ii. handle translation of second CSP states (e.g., Azure states) to first CSP states (e.g., OCI states), and vice versa; and/or iii. delegate the request to intra-cloud services 1014 of the first CSP to execute (e.g., to a resource control plane 1016, such as an OCI DBaaS control plane). The inter-cloud service 1012 is also configured to coordinate any second CSP specific integrations with other second CSP services (e.g., with Azure Resource Provider). The inter-cloud service 1012 can also be configured to perform or cause other intra-cloud services 1014 to perform operations including linking cloud accounts, publishing observability information and vending tokens to access other cloud customer environments.

The intra-cloud services 1014 can provide a portal of the first CSP (shown as CSP_A Portal 1018) accessible to the customer device 1000 of the customer to manage other services of the customer with the first CSP. The two portals 1052 and 1018 can enable similar functionalities (e.g., by presenting inputs and outputs fields) and yet be different. For example, the portal 1052 (e.g., an Azure portal) can have a presentation format controlled by the second CSP. Additionally, the portal 1052 can enable functionalities specific to the second CSP and unrelated to the first CSP, in addition to the functionalities related to the cross-cloud service. In comparison, the portal 1018 (e.g., an OCI portal) can have a presentation format controlled by the first CSP. Additionally, the portal 1018 can enable functionalities specific to the first CSP and unrelated to the second CSP, in addition to the functionalities related to the cross-cloud service. As far as the cross-cloud service, the portal 1052 can expose information available from the second CSP, where this information can be provided by the inter-cloud service 1012.

In an example of an OCI and Azure use case, the inter-cloud service 1012 exposes Oracle DB Products. The inter-cloud service 1012 can be registered with ARM through RPaaS and is configured implement the Azure Resource Provider Contract (RPC), which is a set of operations that all Azure Resource Providers support. The Azure RPaaS internal service is used to support the bulk of RPC operations.

Generally, the inter-cloud service 1012 can be configured to have a second CSP identity (e.g., an Azure RP identity equivalent to an OCI service principal), as well as the ability to operate on a second CSP customer environment using the second CSP flows (e.g., Azure OBO flows). The inter-cloud service 1012 can also be configured to persist second CSP-specific metadata for a first CSP resource, such as the Azure identifier to OCID mapping for DB resources. The inter-cloud service 1012 can also be configured have a first CSP identity to obtain a scope to operate on the first CSP customer environment. The inter-cloud service 1012 can also be configured to act as a thin adaptor layer, accepting second CSP formatted requests that have already been authenticated by the services 1054, translating them to a first CSP request and delegating the request to the intra-cloud services.

As such, the inter-cloud service 1012 performs multiple operations. These operations include translating identifiers from one cloud to another cloud, and vice versa. The operations also include obtaining a first CSP identity for incoming requests from the services 1054 to use in calling the intra-cloud services 1014. These operations also include translating second CSP format requests into first CSP format requests and call the intra-cloud services 1014. The operations also include limiting/quota/capacity validation pass-through or conciliation, implicitly creating first CSP prerequisites for network connectivity for network connected resources (e.g., creating OCI DRG, VCN and subnet that a VMCluster is attached to), causing the linking of private clouds, and configuring DNS entries with the second CSP for resources that have a DNS record associated with them.

In an example, the inter-cloud service 1012 can be hosted in one or more child sites. The inter-cloud service 1012 can cause a virtual resource 1020 to be hosted in a child site. In an Exadata service use case, the virtual resource 1020 can include a DBaaS data plane via a DBaaS control plane. This control plane is hosted in a parent region, as part of the intra-cloud services 1014. In this use case, a compute instance (e.g., a VM) can be instantiated for the customer on a private cloud of the customer with the second CSP (e.g., a VNET in Azure). The compute instance can perform database operations by placing calls to the DBaaS data plane. Such operations include queries, storage, etc. or any operation that the Exadata service supports. The calls and responses thereto can be internal to the private cloud with the second CSP. Upon usage, the DBaaS data plane can report usage information (e.g., for metrics analysis, billing, etc.) to one or more of the intra-cloud services 1014 (e.g., to an observability service). This usage information can then be provided to a monitoring service of the second CSP.

Figure 11:
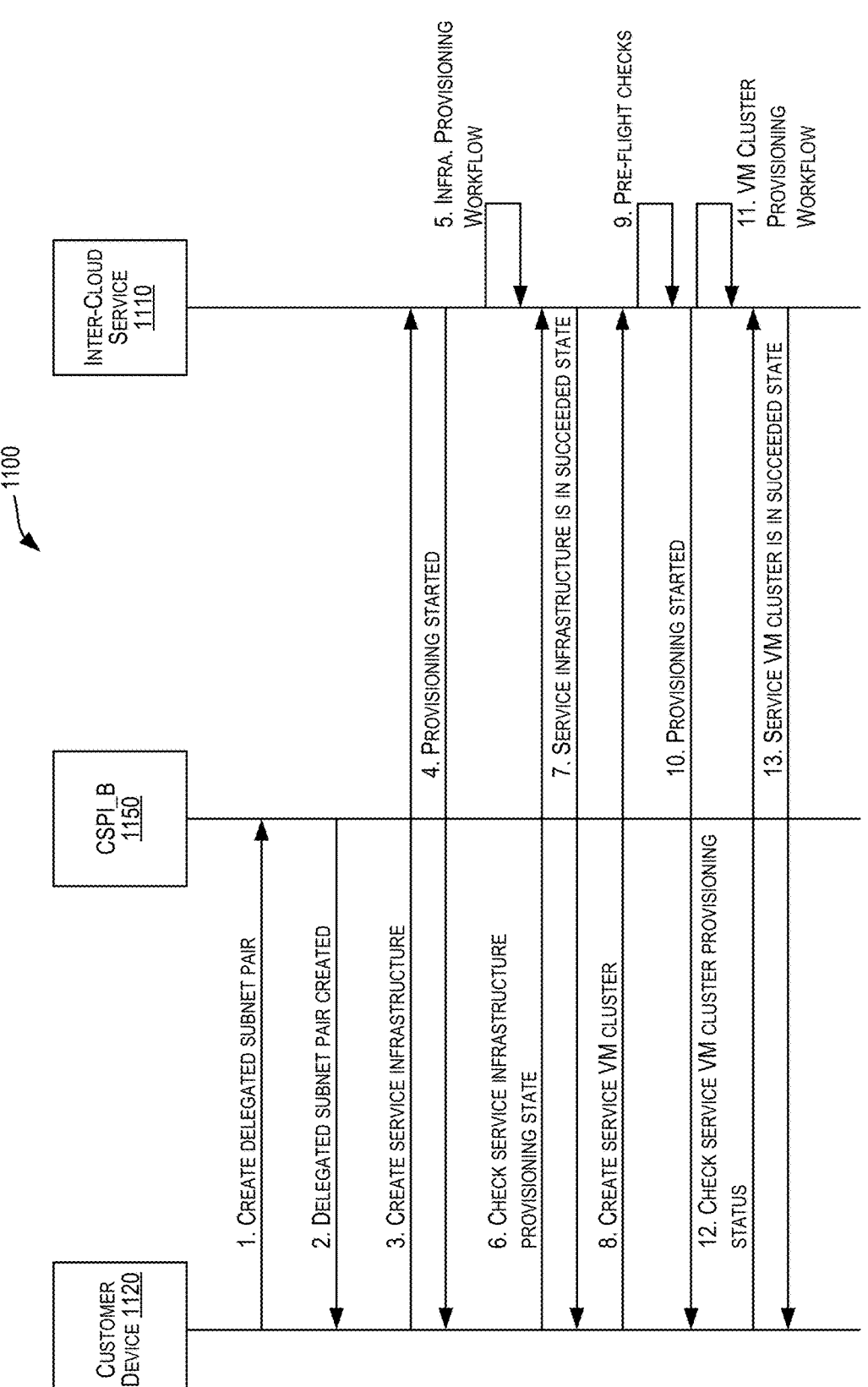
FIG. 11 depicts an exemplary user experience flow to provision resources, according to some embodiments.

FIG. 11 depicts an exemplary user experience flow 1100 to provision resources, according to some embodiments. In an example, the user experience flow 1100 involves a customer device 1120, a CSPI_B 1150 of a second CSP, and an inter-cloud service of a first CSP. The first CSP can offer a cross-cloud service via the second CSP. A virtual resource can be provisioned to provide at least a part of the cross-cloud service, where the provisioning follows the user experience flow 1100.

User input is received by the CSPI_B 1150 (e.g., by a portal, similar to the CSP_B portal 1052 of FIG. 10) from the customer device 1120 to create a subnet and to mark it as being delegated such that it can be used for the cross-cloud service. The subnet and the customer's second private cloud with the second CSP are created, and an indication of this creation is provided to the customer device 1100.

Next, user input is received by inter-cloud service 1110 from the computing device 1100 (where this input can be at the portal) and indicates a request to create a cross-cloud service infrastructure (e.g., an Exadata service). The user input can indicate various parameters for the provisioning, such as a region and an availability zone. The inter-cloud service 1110 can indicate a star of the provisioning to the computing device 1100 (e.g., via the portal) and can execute a provisioning workflow by which the cross-cloud service infrastructure is created in the relevant child site. While this infrastructure is being created, the inter-cloud service 1110 sets its state to "provisioning." Once created, the inter-cloud service 1110 updates the state to "succeeded" and provides. Indications of these states can be provided to the computing device 1100 (e.g., via the portal). Similarly, computing device 1100 can check the current state via the portal, where a state querying request can be made from the CSPI_B 1150 to the inter-cloud service 1110 and the inter-cloud service 1110 would respond back with the state information.

Thereafter, user input is received by the inter-cloud service 1110 from the CSPI_B 1150 (where this input is provided at the portal) and corresponds to a request from the computing device 1100 to create a VM cluster resource. The request can indicate a subnet. The inter-cloud service 1110 then executes a set of checks and starts provisioning the VM cluster. This provisioning is further described in the next figure. The inter-cloud service 1110 sets the state to "provisioning." Once created, the inter-cloud service 1110 updates the state to "succeeded." Here also, indications of these states can be provided to the computing device 1100 (e.g., via the portal). Similarly, computing device 1100 can check the current state via the portal, where a state querying request can be made from the CSPI_B 1150 to the inter-cloud service 1110 and the inter-cloud service 1110 would respond back with the state information.

Figure 12:
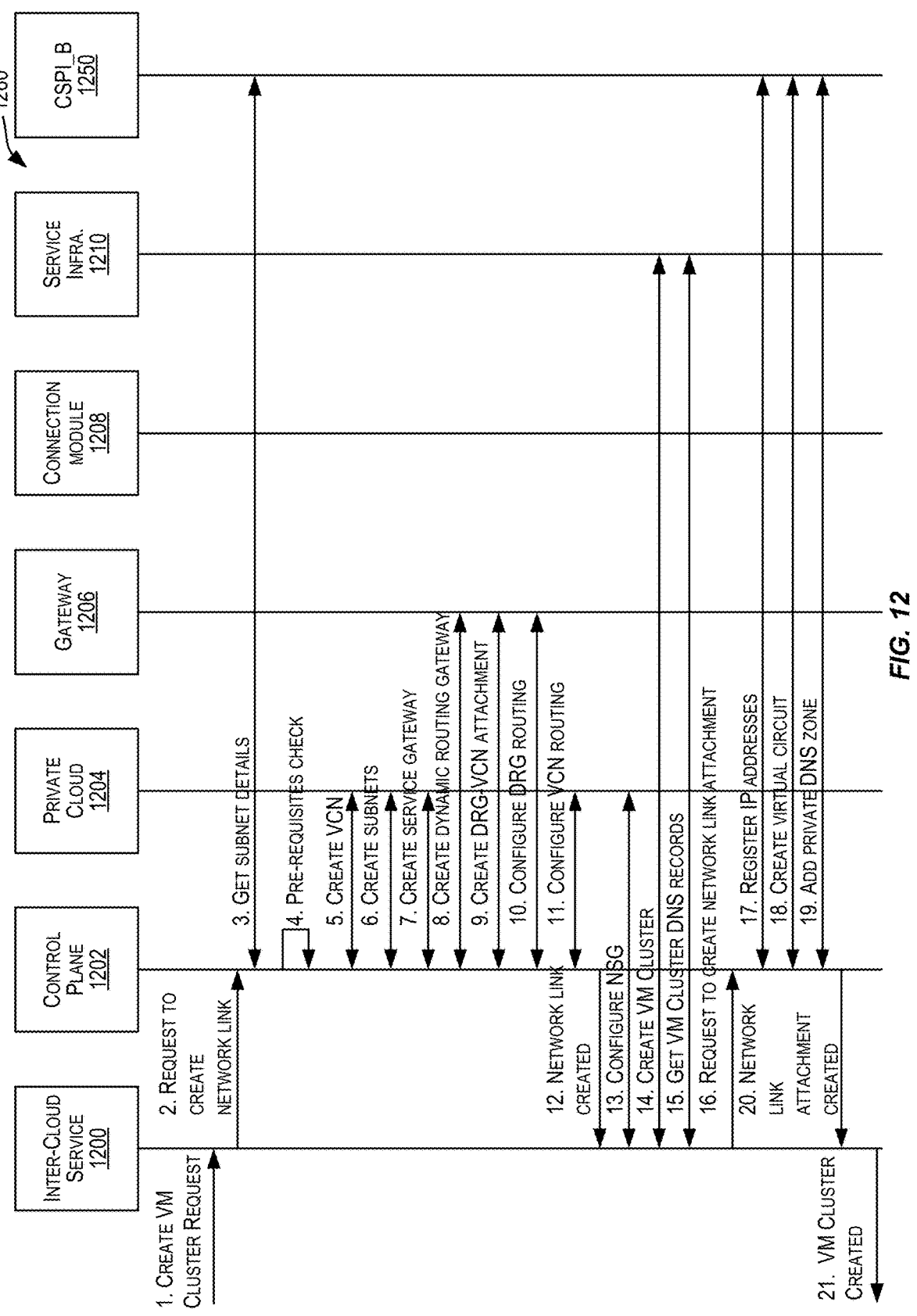
FIG. 12 depicts an exemplary control plane provisioning flow, according to some embodiments.

FIG. 12 depicts an exemplary control plane provisioning flow 1260, according to some embodiments. In an example, the control plane provisioning flow 1260 involves an inter-cloud service 1200, a control plane 1202 (e.g., an example of an intra-cloud service), a private cloud 1204 of a customer with a first CSP, a gateway 1206 (e.g., a DRG), a connection module 1208 (e.g., one provided by a connectivity fabric and supporting a connection protocol, such as FastConnect), a cross-cloud service infrastructure 1210 with the first CSP, and a CSPI_B 1250 of a second CSP. The first CSP can offer a cross-cloud service via the second CSP. Here, the control plane 1202 can execute part of the control plane provisioning flow 1260 upon being triggered by the inter-cloud service 1200 to provision VM cluster resources. The inter-cloud service 1200 can make such a call to the control plane 1202 upon receiving input from the CSPI_B 1250 (from ARM in Azure) in response to a user input a portal of the second CSP.

As described herein above, the inter-cloud service 1220 receives a request to create a VM cluster for the cross-cloud service (e.g., an Exadata VM cluster) and passes this request with other information (e.g., first identifiers assigned by the first CSP and mapped to second identifiers assigned by the second CSP) to the control plane 1202. In turn, the control plane 1202 retrieves details from CSPI_B 1250 (e.g., from ARM in Azure) about a subnet, including the CIDR, for example and verifies that pre-requisites (e.g., the subnet has been provisioned, the region of a second private cloud with the second CSP (e.g., the VNET in Azure), etc.) are met. The control plane 1202 then creates a first private cloud with the first CSP (e.g., a VCN in OCI) in the customer tenancy (e.g., based on the first identifiers) and creates a subnet in the first private cloud. This subnet has the same CIDR as the subnet in the second private cloud.

Next, the control plane 1202 creates configures the gateway 1206 (e.g., the DRG) in the service tenancy and request to attach the gateway 1206 to the first private cloud in the customer's tenancy. The control plane 1202 also configures the routing information in the gateway 1206 (e.g., by creating a DRG routing table for traffic between the two private clouds or MeetMe router). Similarly, the control plane 1202 also configures the routing information in the first private cloud (e.g., by creating a VCN routing table for traffic to the DRG and the VM Cluster). Once the routing information has been created, the control plane 1202 can inform inter-cloud service 1200 about the success. In response, the inter-cloud service 1200 can configure a network security group for the first private cloud and request a VM cluster to be created. The VM cluster is then provisioned in the relevant child site, whereby IP addresses from the CIDR are assigned to it. DNS records corresponding to the IP addresses are also generated. The inter-cloud service 1200 can receive such DNS records and request attachment of the first private network to the second private network (e.g., the VCN to the VNET).

The control plane 1202 then calls an API of the second CSP, where this API allows IP address injection into the customer subnet in a form of a NIC. Each IP address can represent a VM Cluster node IP. The control plane 1202 can register all IP addresses that the VM cluster will have. The API call can include a device identifier (e.g., GUID of the MeetMe router). This identifier can be based on a mapping of GUIDs mapped to physical locations (child sites). The call can also include a subnet resource identifier (e.g., the private network's subnet in the customer tenancy), an IP address (e.g., the IP address of the NIC that is being created, where this address is in the subnet range), and a resource name (the name of the NIC that will be visible to the user). The API can return a virtual local area network identifier (VLAN ID), which is usable during a virtual circuit creation. The control plane 1202 then creates a virtual circuit that uses a connection (e.g., FastConnect connection) to a router of the CSPI_B 1250 (e.g., to a MeetMe router) and provides the DNS records such that a private DNS zone can be added to the customer's second private network. At this point, the VM cluster is created successfully. Compute instances for the cross-cloud service (e.g., Exadata database instances) can then be hosted in the VM cluster.

Resource Provider

As discussed above, a first CSP may provide intra-cloud services (e.g., database services, storage services, compute services, and the like) to customers of the first CSP and a second CSP may provide similar intra-cloud services to customers of the second CSP. A customer of the second CSP may also be a customer of the first CSP and may wish to access intra-cloud services provided by the first CSP via their tenancy in a cloud environment provided by the second CSP. As such, the first CSP may provide an intra-cloud service as a cross-cloud service to customers of the second CSP. Similarly, the second CSP may provide an intra-cloud service such as a cross-cloud service to customers of the first CSP. At least one of the cross-cloud services offered by one CSP to customers of another CSP can be the same service as an intra-cloud service offered by the one CSP to its own customers. In this way, customers of one CSP can be provided with a platform-level experience of another CSP from within the cloud environment of the one CSP. Additionally, customers of the one CSP can be exposed to new features, releases, and resources of the other CSP without leaving the cloud environment of the one CSP.

For example, Oracle as a CSP provides intra-cloud services via OCI to its own customers and Microsoft as a CSP can provide similar intra-cloud services via Azure to its own customers. A Microsoft Azure customer may also be an Oracle OCI customer and may wish to access intra-cloud services provided by Oracle's OCI via their Microsoft Azure tenancy. As such, Oracle's OCI can provide an intra-cloud service such as Oracle's Exadata database service as a cross-cloud service to Microsoft Azure customers. Similarly, Microsoft's Azure can provide an intra-cloud service such as Azure Synapse Analytics as a cross-cloud service to Oracle OCI customers. At least one of the cross-cloud services offered by Oracle's OCI to Microsoft Azure customers can be the same service as an intra-cloud service offered by Oracle's OCI to one of its own customers. For example, Oracle's OCI can provide Oracle's Exadata database service to its own customers and to Microsoft Azure customers through Microsoft's Azure environment. In this way, Microsoft Azure customers can be provided with a platform-level experience of Oracle's OCI from within Microsoft Azure. Additionally, Microsoft Azure customers can be exposed to new features, releases, and resources of Oracle's OCI without leaving Microsoft Azure. While Oracle's OCI and Microsoft's Azure have been used as examples, the techniques described throughout are not limited to these CSPs and may similarly applied to other CSPs such as Google Cloud™ and AWS®.

To facilitate providing cross-cloud services, child sites may be provided in respective CSPIs of different CSPs and cross-cloud services offered by other respective CSPs may be accessed using the child sites. For example, in the case of OCI and Azure described above, a child site may be provided in an Azure CSPI and may provide access to an Exadata database service offered by OCI from within the Azure cloud environment. Providing access to cross-cloud services using child sites can provide high-bandwidth access to those cross-cloud services with reduced latency relative to those cross-cloud services being accessed through the first CSP and/or other remote cloud environments. However, resources such as compute resources at each child site may be limited. Therefore, it may be desirable to provide to one or more management mechanisms to provision and manage the lifecycle of cross-cloud services from within one or more CSPIs and/or cloud environments. The techniques described herein pertain to resource management mechanisms for provisioning and the managing the lifecycle of cross-cloud services offered by and between one or more CSPs. The resource management mechanisms described herein are dynamic in that characteristics of the child sites, cloud environments, and/or the CSPIs of the CSPs along with other factors can be considered in provisioning and managing a cross-cloud service.

Figure 13:
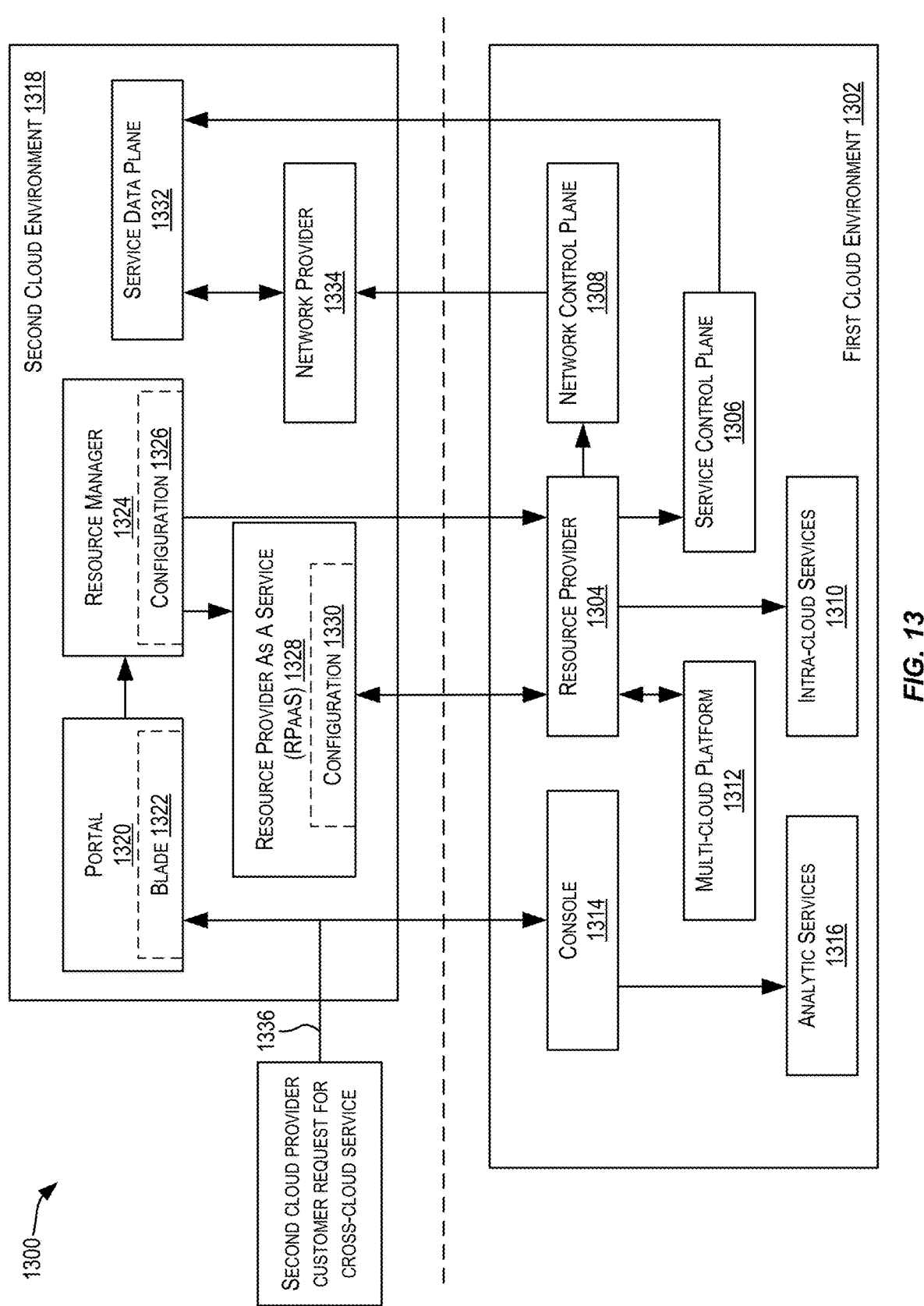
FIG. 13 depicts an example of an architecture that includes resource management mechanisms for provisioning and managing cross-cloud services between multiple cloud environments, according to some embodiments.

FIG. 13 depicts an example of an architecture 1300 that includes resource management mechanisms for provisioning and managing cross-cloud services between multiple cloud environments. As shown in FIG. 13, the architecture 1300 can include a first cloud environment 1302 of a first CSP (e.g., Oracle's OCI) and a second cloud environment 1318 of a second CSP (e.g., Microsoft's Azure). The first cloud environment 1302 and the second cloud environment 1318 can be implemented according to the distributed environment described with respect to FIGS. 6-9. The first cloud environment 1302 and the second cloud environment 1318 can include one or more private clouds (e.g., a VCN in the case of Oracle's OCI and a VNET in the case of Microsoft's Azure). Additionally, a cross-cloud service between the first cloud environment 1302 and the second cloud environment 1318 can be provisioned according to the experience and provisioning flows described with respect to FIGS. 10-12.

The first cloud environment 1302 can be configured to receive requests for cross-cloud services, evaluate permission statuses for such requests, generate instructions for provisioning such services in one or more other cloud environments such as the second cloud environment 1318, deploy such services in the one or more other cloud environments, and manage the deployed services. In some implementations, the intra-cloud services 1310 of the first cloud environment 1302 can be configured to provide one or more of the intra-cloud services 1310 (e.g., an Exadata intra-cloud service) as one or more cross-cloud services (e.g., an Exadata cross-cloud service) to customers having a tenancy in the second cloud environment 1318. Provisioning an intra-cloud service offered by the first cloud environment 1302 as a cross-cloud service between the first cloud environment 1302 and the second cloud environment 1318 can at least be facilitated by the resource provider 1304 of the first cloud environment 1302. To provision a cross-cloud service, the resource provider 1304 can be configured to send a provisioning request for the requested cross-cloud service to the service control plane 1306 and the network control plane 1308 of the first cloud environment 1302 and, in response, the service control plane 1306 and the network control plane 1308 can deploy an intra-cloud of the intra-cloud services 1310 as a cross-cloud service to the second cloud environment 1318 (e.g., to the service data plane 1332 and network provider 1334 of the second cloud environment 1318).

In some implementations, the first cloud environment 1302 can include multiple parent regions and the second cloud environment 1318 can include multiple child sites corresponding to the multiple parent regions. In some implementations, the service data plane 1332 of the second cloud environment 1318 can serve as and/or form one or more child sites of a respective parent region. In some implementations, each respective parent region of the first cloud environment 1302 can include a resource provider such as the resource provider 1304 that together with one or more child sites associated with the respective parent region facilitates the provisioning and lifecycle management of one or more cross-cloud services. The one or more cross-cloud services can include one or more of the intra-cloud services 1310 of the first cloud environment 1302. For example, the resource provider 1304 can be a resource provider for a parent region in the first cloud environment 1302 and can provision and manage the lifecycle of an intra-cloud service of the intra-cloud services 1310 as a cross-cloud service between the service control plane 1306 of the first cloud environment 1302 and the service data plane 1332 of the second cloud environment 1318. Child sites can at least be implemented according to the physical architecture described above with respect to FIG. 7.

In some implementations, provisioning of cross-cloud services between the first cloud environment 1302 and the second cloud environment 1318 can be facilitated by the resource provider 1304 of the first cloud environment 1302 and the resource manager 1324 of the second cloud environment 1318. For example, the resource manager 1324 of the second cloud environment 1318 may send a cross-cloud service provisioning request to the resource provider 1304 of the first cloud environment 1302 and, in response, the resource provider 1304 can facilitate the provisioning of the cross-cloud service together with the second cloud environment 1318.

Similarly, managing the lifecycle of provisioned cross-cloud services between the first cloud environment 1302 and the second cloud environment 1318 can be facilitated by the resource provider 1304 of the first cloud environment 1302 and the resource manager 1324 of the second cloud environment 1318. For example, the resource manager 1324 of the second cloud environment 1318 may send a request for managing the lifecycle of a provisioned cross-cloud service (e.g., a request to terminate the cross-cloud service) to the resource provider 1304 and, in response, the resource provider 1304 can facilitate the lifecycle management function for the cross-cloud service together with the second cloud environment 1318. In some implementations, to facilitate the provisioning and lifecycle management, the resource manager 1324 can be configured to communicate with the resource provider 1304 (e.g., using APIs of the first cloud environment 1302 that are exposed by the resource provider 1304 to the resource manager 1324).

In some implementations, a customer of the second cloud environment 1318 and/or the second CSP desiring to provision a cross-cloud service from within the second cloud environment 1318 and/or manage a cross-cloud service that has been provisioned in conjunction with the second cloud environment 1318 can initiate a request 1336 to do. The customer can initiate the request 1336 via the portal 1320 of the second cloud environment 1318. In some implementations, the portal 1320 can include one or more graphical user interfaces that can be accessed via a client device such as a computer (e.g., through an application, operating system, and/or software program executing on the client device). The one or more graphical user interfaces or portions thereof can be generated by, populated by, and/or otherwise supplied by the resource manager 1324 of the second cloud environment 1318. Customers of the second cloud environment 1318 can access the portal 1320 to manipulate and/or interact with the one or more graphical user interfaces to initiate the request 1336 and perform other functions such as manage their tenancy within the second cloud environment 1318.

In some implementations, the one or more graphical user interfaces or portions thereof can be generated by, populated by, and/or otherwise supplied by the resource provider 1304 of the first cloud environment 1302. The one or more graphical user interfaces or portions thereof can be provided to and/or declared to the portal 1320 using a blade 1322 of the portal 1320. The blade 132 can serve as and/or function as an extension, plugin, add-on, and the like of the portal 1320. Customers of both the first cloud environment 1302 and the second cloud environment 1318 can access the portal 1320 to manipulate and/or interact with the one or more graphical user interfaces to initiate the request 1336 and perform other functions such as manage their tenancies within the first cloud environment 1302 and the second cloud environment 1318.

In some implementations, requests received via the portal 1320 to provision a cross-cloud service can be routed to the resource manager 1324 of the second cloud environment 1318 which in turn can route the request 1336 to the resource provider 1304 of the first cloud environment 1302 (e.g., via a first set of APIs of the first cloud environment 1302 that are exposed within the resource manager 1324). On the other hand, requests received via the portal 1320 to manage the lifecycle of a provisioned cross-cloud service (e.g., viewing analytics, consumption, costs, logs, etc.) can be routed to a console 1314 of the first cloud environment 1302 which in turn can route the request 1336 within the first cloud environment 1302 (e.g., via a second of APIs that are exposed within first cloud environment 1302). For example, the console 1314 can be configured to route the request 1336 to analytic services 1316 of the first cloud environment 1302 for viewing analytics, consumption, costs, logs, and the like pertaining to the provisioned cross-cloud service. In some implementations, respective customers of the second cloud environment 1318 may be assigned respective identifiers such that each request 1336 initiated by a respective customer of the second cloud environment 1318 can be associated with the identifier for that respective customer. In this way, access to the portal and request initiation can be controlled and managed by the resource manager 1324 based on roles and/or permissions associated with each customer identifier.

To facilitate the provisioning of a cross-cloud service and lifecycle management of a provisioned cross-cloud service, the resource provider 1304 can be linked to the resource manager 1324 and a resource provider as a service (RPaaS) 1328 of the second cloud environment 1318. Linking the resource provider 1304 to the second cloud environment 1318 enables the resource provider 1304, resource manager 1324, and RPaaS 1328 to coordinate resources and operations. The resource provider 1304 can have an identity that is associated with the second cloud environment 1318. The identity can be configured to replicate an identity that the resource provider 1304 has with the first cloud environment 1302. To facilitate the linking, the resource provider 1304 can provide a configuration 1326 to the resource manager 1324 and a configuration 1330 to the RPaaS 1328. The configuration 1326 and the configuration 1330 can include an identifier for the resource provider 1304 and can define API specifications, connection endpoints, and/or locations of intra-cloud services associated with the resource provider 1304.

The resource provider 1304 can be configured to provision a cross-cloud service and/or manage of the lifecycle of a provisioned cross-cloud service based on operations performed by the multi-cloud platform 1312 of the first cloud environment 1302. The multi-cloud platform 1312 can be configured to perform operations that are common to linking and integrating the first cloud environment 1302 to the second cloud environment 1318 and other cloud environments of other CSPs. For example, the multi-cloud platform 1312 can be configured to link the customer's account for the second CSP to the customer's account for the first CSP, publish observation information collected from the first cloud environment 1302 and/or the second cloud environment 1318, generate vending tokens for accessing the customer's other cloud environments, and the like. Additionally, the multi-cloud platform 1312 can be configured to create, define, supply, and/or otherwise implement a contract between the resource provider 1304, the resource manager 1324, and the RPaaS 1328. The contract can identify resources supported by and/or operations to be performed by the resource provider 1304, the resource manager 1324, and the RPaaS 1328. In some implementations, the contract can allow the resource provider 1304, the resource manager 1324, and the RPaaS 1328 to operate on the same tenancy within the first cloud environment 1302. For example, the contract can define provisioning and/or lifecycle management events that are to be sent from the resource manager 1324 and/or RPaaS 1328 upon occurrence of such events where the resource provider 1304 can be configured to perform provisioning and/or lifecycle management operations asynchronously based on the reception and/or a change in status of such events.

The multi-cloud platform 1312 can be further configured to perform generalized cloud management operations including, but not limited to: (i) mapping subscriptions and tenancies of the second cloud environment 1318 to the subscriptions and tenancies of the first cloud environment 1302; (ii) generating and managing policy statements that govern tenancies in respective cloud environments (e.g., a statement that facilitates the multi-cloud platform 1312 and the resource provider 1304 to operate in the same tenancy); (iii) generating and managing access tokens that facilitate cross-cloud access and/or communication between respective cloud environments; and/or (iv) mapping observability information of the first cloud environment 1302 to the second cloud environment 1318 (e.g., writing an event to the second cloud environment 1318 when a backup is completed on the first cloud environment 1302, writing resource logs of the first cloud environment 1302 to the second cloud environment 1318, and the like). In this way, the first cloud environment 1302 and the second cloud environment 1318 can avoid overlapping operations and resources, which in turn can increase efficiency.

In some implementations, upon receiving the request 1336 to provision a cross-cloud service, the resource provider 1304 can be configured to map the request 1336 to an identifier of the first cloud environment 1302 and pass the request along to the service control plane 1306. The service control plane 1306 can be configured to perform two main processes: the first process is to provision the relevant resources of the first cloud environment 1302; and the second process is to connect these resources to the customer's tenancy in the second cloud environment 1318 (e.g., the customer's VNET in the second cloud environment 1318). Under the first process, the service control plane 1306 creates a VCN for the customer in the first cloud environment 1302 and creates one or more subnets within the VCN. In some implementations, the VCN can function as a shadow tenancy for the customer's tenancy in the second cloud environment 1318. One or more of the subnets within the VCN and one or more subnets in the VNET can use the same CIDR. The service control plane 1306 also creates a DRG in the first cloud environment 1302 and attaches the DRG to the customer's VCN and configures routing information for the DRG and the VCN (e.g., to interconnect these two resources). The service control plane 1306 also provisions a VM cluster in the service data plane 1332. IP address(es) of this VM cluster are from the CIDR and are mapped to corresponding DNS records. Under the second process, the service control plane 1306 registers these IP address(es) with the second cloud environment 1318 and creates a virtual circuit between the DRG and the network provider 1334 and sends the DNS records such that a private DNS zone can be set up in second cloud environment 1318.

Additionally, or alternatively, upon receiving the request 1336 to provision a cross-cloud service, the resource provider 1304 is configured to: (i) map an identifier assigned to the customer by the second CSP to an identifier assigned to the customer by the first CSP; (ii) obtain the identity of the resource provider 1304 that is associated with the request 1336 (i.e., the second cloud environment 1318 from which the request 1336 originates); (iii) translate the format of the request 1336 from that of the second cloud environment 1318 to that of the first cloud environment 1302 and route the formatter request along with the mapped identifier to the service control plane 1306 and network control plane 1308; (iv) establish network connectivity prerequisites for network connectivity between the first cloud environment 1302 and the second cloud environment 1318 (e.g., establish DRG, VCN, and subnets for connecting to the network provider 1334 and VMs of the service data plane 1332 of the second cloud environment 1318); (v) establish network connectivity between the network control plane 1308 and the network provider 1334 based on the network connectivity prerequisites (e.g., linking the delegated subnets of the second cloud environment 1318 to the VCN of the first cloud environment 1302 and configuring DNS entries in the second cloud environment 1318). Additionally, once the cross-cloud service is provisioned, the resource provider 1304 can be configured to persist metadata between the first cloud environment 1302 and the second cloud environment 1318 (e.g., the mapping between the identifier for the second cloud environment 1318 and the first cloud environment 1302) and act as a thin adaptor layer that accepts requests that are formatted for the second cloud environment 1318 and that have already been authenticated by resource manager 1324 (e.g., requests to manage the lifecycle of provisioned cross-cloud services), translates them into requests that are formatted for the first cloud environment 1302, and delegates the translated requests to the service control plane 1306.

Illustrative Method

FIG. 14 illustrates an example process 1400 for provisioning and managing cross-cloud services between multiple cloud environments. The processing depicted in FIG. 14 may be implemented in software (e.g., code, instructions, a program) executed by one or more processing units (e.g., one or more processors, cores) of the respective systems, hardware, or combinations thereof described throughout. The software may be stored on a non-transitory storage medium (e.g., on a memory device). Although the method presented in FIG. 14 depicts the various processing steps occurring in a particular sequence or order, this is not intended to be limiting. In certain alternative implementations, the steps may be performed in parallel and/or in a different order. In certain implementations, such as in the embodiments depicted in FIGS. 6-13, the processing depicted in FIG. 14 may be performed by the physical components of a cloud environment such as the first cloud environment 1302 and/or the second cloud environment 1318.

At block 1402, a first private cloud within a first cloud environment is integrated with a second private cloud within a second cloud environment. In some implementations, the first private cloud is integrated with the second private cloud by linking an identifier associated with a component of the first private cloud to an identifier associated with a component of the second private cloud. In some implementations, the component of the first private cloud can be a resource provider of the first private cloud and the component of the second private cloud can a resource manager and/or RPaaS of the second private cloud. In some implementations, linking the resource provider of the first private cloud and/or cloud environment to the second private cloud and/or cloud environment enables the resource provider, resource manager, and RPaaS to coordinate resources and operations. The resource provider can have an identity that is associated with the second cloud environment. The identity can be configured to replicate an identity that the resource provider has with the first cloud environment. To facilitate the linking, the resource provider can provide a configuration to the resource manager and a configuration to the RPaaS. One or more of the configurations can include an identifier for the resource provider and can define API specifications, connection endpoints, and/or locations of intra-cloud services associated with the resource provider.

At block 1404, a determination is made as to whether a request for a cloud service has been received. In response to receiving the request, the flow can proceed to block 1406. In the case a request has not been received, another determination can be made as to whether a request for a cloud service has been received. In some implementations, the request can be received by the component of the first private cloud and/or cloud environment from the component of the second private cloud and/or cloud environment. In some implementations, the request is initiated in response to a customer device interacting with a portal of the second private cloud. The customer device can be associated with a customer account corresponding to the second private cloud. In some implementations, the portal is configured to present a portion of a graphical user interface provided by the first component. The request can be initiated in response to the customer device interacting with the portion. In some implementations, the cloud service can be cross-cloud service offered by a first CSP providing the first cloud environment to customers of a second CSP providing the second cloud environment and/or end users having a tenancy in the second cloud environment.

In some implementations, a customer of the second cloud environment and/or second CSP desiring to provision a cross-cloud service from within the second cloud environment and/or manage a cross-cloud service that has been provisioned in conjunction with the second cloud environment can initiate a request to do via the portal of the second cloud environment. In some implementations, the portal can include one or more graphical user interfaces that can be accessed via a client device such as a computer (e.g., through an application, operating system, and/or software program executing on the client device). The one or more graphical user interfaces or portions thereof can be generated by, populated by, and/or otherwise supplied by the resource manager of the second cloud environment. Customers of the second cloud environment can access the portal to manipulate and/or interact with the one or more graphical user interfaces to initiate the request and perform other functions such as manage their tenancy within the second cloud environment.

In some implementations, the one or more graphical user interfaces or portions thereof can be generated by, populated by, and/or otherwise supplied by the resource provider of the first cloud environment. The one or more graphical user interfaces or portions thereof can be provided to and/or declared to the portal using a blade of the portal. The blade can serve as and/or function as an extension, plugin, add-on, and the like of the portal. Customers of both the first cloud environment and the second cloud environment can access the portal to manipulate and/or interact with the one or more graphical user interfaces to initiate the request and perform other functions such as manage their tenancies within first cloud environment and the second cloud environment.

In some implementations, requests received via the portal to provision a cross-cloud service can be routed to the resource manager of the second cloud environment which in turn can route the request to the resource provider of the first cloud environment (e.g., via a first set of APIs of the first cloud environment 1302 that are exposed within the resource manager). On the other hand, requests received via the portal to manage the lifecycle of a provisioned cross-cloud service (e.g., viewing analytics, consumption, costs, logs, etc.) can be routed to a console of the first cloud environment which in turn can route the request within the first cloud environment (e.g., via a second of APIs that are exposed within first cloud environment). For example, the console can be configured to route the request to analytic services of the first cloud environment for viewing analytics, consumption, costs, logs, and the like pertaining to the provisioned cross-cloud service. In some implementations, respective customers of the second cloud environment may be assigned respective identifiers such that each request initiated by a respective customer of the second cloud environment can be associated with the identifier for that respective customer. In this way, access to the portal and request initiation can be controlled and managed by the resource manager based on roles and/or permissions associated with each customer identifier.

At block 1406, a set of operations associated with provisioning the cloud service in the second private cloud and/or cloud environment is performed. In some implementations, the set of operations is performed by the component of first private cloud and/or cloud environment and at least one operation of the set of operations includes establishing network connectivity prerequisites for network connectivity between the first private cloud and/or cloud environment and the second private cloud and/or cloud environment. In some implementations, establishing the network connectivity prerequisites includes creating a first subnet within the first private cloud and a second subnet within the second private cloud. In some implementations, at least one Internet Protocol address associated with the first subnet and at least one Internet Protocol address associated with the second subnet are within a CIDR range.

In some implementations, upon receiving the request to provision a cross-cloud service, the resource provider can be configured to: (i) map an identifier assigned to the customer by the second CSP to an identifier assigned to the customer by the first CSP; (ii) obtain the identity of the resource provider that is associated with the request (i.e., the second cloud environment from which the request originates); (iii) translate the format of the request from that of the second cloud environment to that of the first cloud environment and route the formatter request along with the mapped identifier to the service control plane and network control plane; and (iv) establish network connectivity prerequisites for network connectivity between the first cloud environment and the second cloud environment (e.g., establish DRG, VCN, and subnets for connecting to the network provider and VMs of the service data plane of the second cloud environment). In some implementations, upon receiving the request to provision the cross-cloud service, the resource provider can be configured to map the request to an identifier of the first cloud environment and pass the request along to a service control plane of the first cloud environment.

At block 1408, one or more second components of the first private cloud and/or cloud environment cause the cloud service to be provisioned in the second private cloud and/or cloud environment. In some implementations, the first component of the first private cloud and/or cloud environment causes the one or more second components of the first private cloud and/or cloud environment to provision the cloud service in the second private cloud and/or cloud environment. In some implementations causing the one or more second components of the first private cloud and/or cloud environment to provision the cloud service in the second private cloud and/or cloud environment includes causing the one or more second components to establish network connectivity between the first private cloud and/or cloud environment and the second private cloud and/or cloud environment based on the network connectivity prerequisites. In some implementations, causing the one or more second components of the first private cloud and/or cloud environment to provision the cloud service in the second private cloud and/or cloud environment includes causing a virtual machine to be provisioned in another component of the second private cloud and/or cloud environment.

In some implementations, after performing the set of operations, the resource provider can be configured to establish network connectivity between a network control plane of the first cloud environment and a network provider of the second cloud environment based on the network connectivity prerequisites (e.g., linking the delegated subnets of the second cloud environment to the VCN of the first cloud environment and configuring DNS entries in the second cloud environment). Additionally, once the cross-cloud service is provisioned, the resource provider can be configured to persist metadata between the first cloud environment and the second cloud environment (e.g., the mapping between the identifier for the second cloud environment and the first cloud environment) and act as a thin adaptor layer that accepts requests that are formatted for the second cloud environment and that have already been authenticated by resource manager (e.g., requests to manage the lifecycle of provisioned cross-cloud services), translates them into requests that are formatted for the first cloud environment, and delegates the translated requests to the service control plane.

In some implementations, after performing the set of operations, the service control plane can be configured to perform a first process to provision the relevant resources of the first cloud environment and a second process to connect those resources to the customer's tenancy in the second cloud environment (e.g., the customer's VNET in the second cloud environment). Under the first process, the service control plane creates a VCN for the customer in the first cloud environment and creates one or more subnets within the VCN. In some implementations, the VCN can function as a shadow tenancy for the customer's tenancy in the second cloud environment. One or more of the subnets within the VCN and one or more subnets in the VNET can use the same CIDR. The service control plane also creates a DRG in the first cloud environment 1302 and attaches the DRG to the customer's VCN and configures routing information for the DRG and the VCN (e.g., to interconnect these two resources). The service control plane also provisions a VM cluster in the service data plane. IP address(es) of this VM cluster are from the CIDR and are mapped to corresponding DNS records. Under the second process, the service control plane registers these IP address(es) with the second cloud environment and creates a virtual circuit between the DRG and the network provider and sends the DNS records such that a private DNS zone can be set up in second cloud environment.

In some implementations, the resource provider can be configured to provision a cross-cloud service and/or manage of the lifecycle of a provisioned cross-cloud service based on operations performed by a multi-cloud platform of the first cloud environment. The multi-cloud platform can be configured to perform operations that are common to linking and integrating the first cloud environment to the second cloud environment and other cloud environments of other CSPs. For example, the multi-cloud platform can be configured to link the customer's account for the second CSP to the customer's account for the first CSP, publish observation information collected from the first cloud environment and/or the second cloud environment, generate vending tokens for accessing the customer's other cloud environments, and the like. Additionally, the multi-cloud platform can be configured to create, define, supply, and/or otherwise implement a contract between the resource provider, the resource manager, and the RPaaS. The contract can identify resources supported by and/or operations to be performed by the resource provider, the resource manager, and the RPaaS. In some implementations, the contract can allow the resource provider, the resource manager, and the RPaaS to operate on the same tenancy within the first cloud environment. For example, the contract can define provisioning and/or life-cycle management events that are to be sent from the resource manager and/or RPaaS upon occurrence of such events where the resource provider can be configured to perform provisioning and/or lifecycle management operations asynchronously based on the reception and/or a change in status of such events.

The multi-cloud platform can be further configured to perform generalized cloud management operations including, but not limited to: (i) mapping subscriptions and tenancies of the second cloud environment to the subscriptions and tenancies of the first cloud environment; (ii) generating and managing policy statements that govern tenancies in respective cloud environments (e.g., a statement that facilitates the multi-cloud platform and the resource provider to operate in the same tenancy); (iii) generating and managing access tokens that facilitate cross-cloud access and/or communication between respective cloud environments; and/or (iv) mapping observability information of the first cloud environment to the second cloud environment (e.g., writing an event to the second cloud environment when a backup is completed on the first cloud environment, writing resource logs of the first cloud environment to the second cloud environment, and the like). In this way, the first cloud environment and the second cloud environment can avoid overlapping operations and resources, which in turn can increase efficiency.

Examples of Cloud Infrastructure

As noted above, IaaS is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 15:
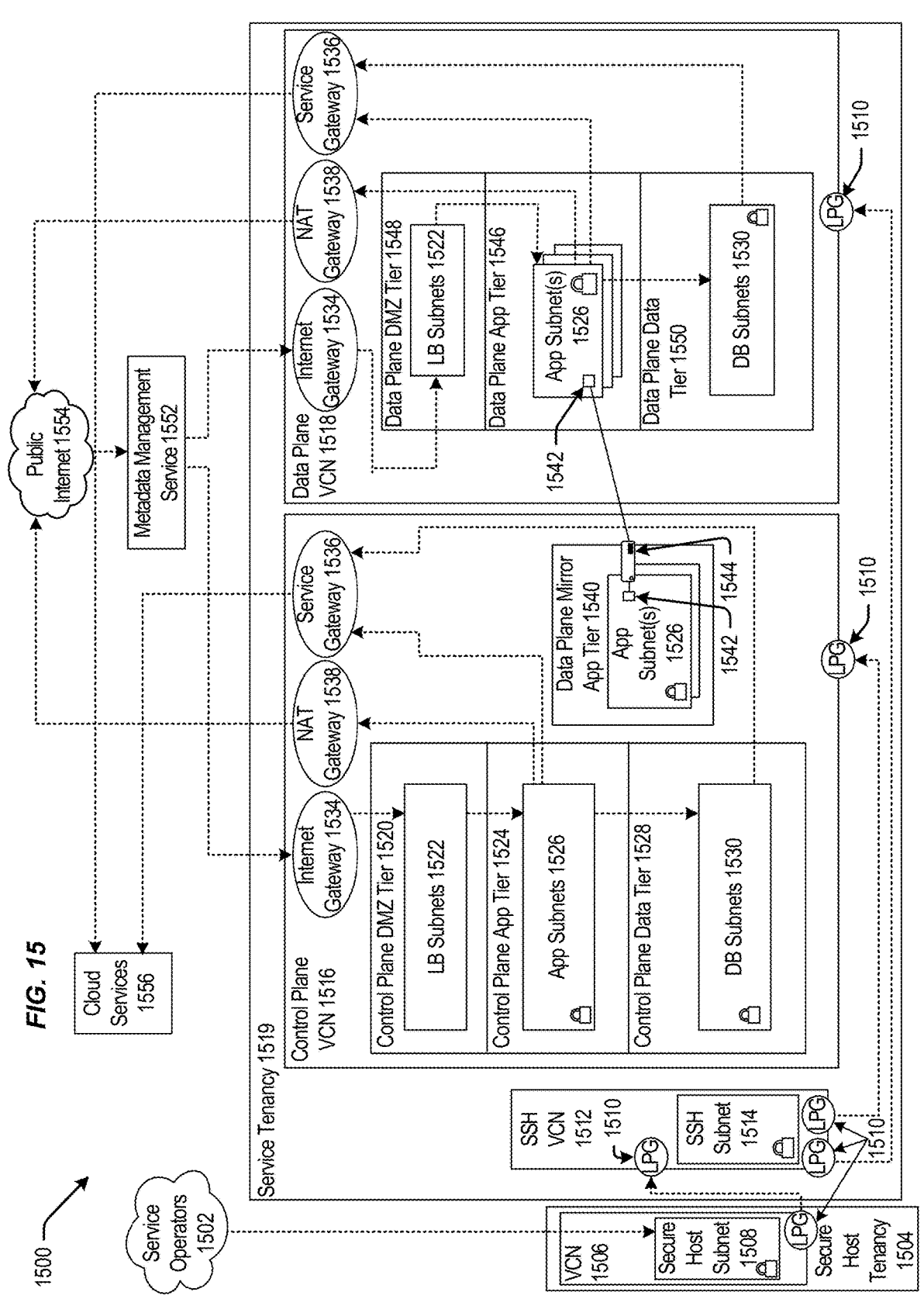
FIG. 15 is a block diagram illustrating one pattern for implementing a cloud infrastructure as a service system, according to certain embodiments.

FIG. 15 is a block diagram 1500 illustrating an example pattern of an IaaS architecture, according to at least one embodiment. Service operators 1502 can be communicatively coupled to a secure host tenancy 1504 that can include a VCN 1506 and a secure host subnet 1508. In some examples, the service operators 1502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1506 and/or the Internet.

The VCN 1506 can include a local peering gateway (LPG) 1510 that can be communicatively coupled to a secure shell (SSH) VCN 1512 via an LPG 1510 contained in the SSH VCN 1512. The SSH VCN 1512 can include an SSH subnet 1514, and the SSH VCN 1512 can be communicatively coupled to a control plane VCN 1516 via the LPG 1510 contained in the control plane VCN 1516. Also, the SSH VCN 1512 can be communicatively coupled to a data plane VCN 1518 via an LPG 1510. The control plane VCN 1516 and the data plane VCN 1518 can be contained in a service tenancy 1519 that can be owned and/or operated by the IaaS provider.

The control plane VCN 1516 can include a control plane demilitarized zone (DMZ) tier 1520 that acts as a perimeter network (e.g., portions of a corporate network between the corporate intranet and external networks). The DMZ-based servers may have restricted responsibilities and help keep breaches contained. Additionally, the DMZ tier 1520 can include one or more load balancer (LB) subnet(s) 1522, a control plane app tier 1524 that can include app subnet(s) 1526, a control plane data tier 1528 that can include database (DB) subnet(s) 1530 (e.g., frontend DB subnet(s) and/or backend DB subnet(s)). The LB subnet(s) 1522 contained in the control plane DMZ tier 1520 can be communicatively coupled to the app subnet(s) 1526 contained in the control plane app tier 1524 and an Internet gateway 1534 that can be contained in the control plane VCN 1516, and the app subnet(s) 1526 can be communicatively coupled to the DB subnet(s) 1530 contained in the control plane data tier 1528 and a service gateway 1536 and a network address translation (NAT) gateway 1538. The control plane VCN 1516 can include the service gateway 1536 and the NAT gateway 1538.

The control plane VCN 1516 can include a data plane mirror app tier 1540 that can include app subnet(s) 1526. The app subnet(s) 1526 contained in the data plane mirror app tier 1540 can include a virtual network interface controller (VNIC) 1542 that can execute a compute instance 1544. The compute instance 1544 can communicatively couple the app subnet(s) 1526 of the data plane mirror app tier 1540 to app subnet(s) 1526 that can be contained in a data plane app tier 1546.

The data plane VCN 1518 can include the data plane app tier 1546, a data plane DMZ tier 1548, and a data plane data tier 1550. The data plane DMZ tier 1548 can include LB subnet(s) 1522 that can be communicatively coupled to the app subnet(s) 1526 of the data plane app tier 1546 and the Internet gateway 1534 of the data plane VCN 1518. The app subnet(s) 1526 can be communicatively coupled to the service gateway 1536 of the data plane VCN 1518 and the NAT gateway 1538 of the data plane VCN 1518. The data plane data tier 1550 can also include the DB subnet(s) 1530 that can be communicatively coupled to the app subnet(s) 1526 of the data plane app tier 1546.

The Internet gateway 1534 of the control plane VCN 1516 and of the data plane VCN 1518 can be communicatively coupled to a metadata management service 1552 that can be communicatively coupled to public Internet 1554. Public Internet 1554 can be communicatively coupled to the NAT gateway 1538 of the control plane VCN 1516 and of the data plane VCN 1518. The service gateway 1536 of the control plane VCN 1516 and of the data plane VCN 1518 can be communicatively coupled to cloud services 1556.

In some examples, the service gateway 1536 of the control plane VCN 1516 or of the data plane VCN 1518 can make application programming interface (API) calls to cloud services 1556 without going through public Internet 1554. The API calls to cloud services 1556 from the service gateway 1536 can be one-way: the service gateway 1536 can make API calls to cloud services 1556, and cloud services 1556 can send requested data to the service gateway 1536. But, cloud services 1556 may not initiate API calls to the service gateway 1536.

In some examples, the secure host tenancy 1504 can be directly connected to the service tenancy 1519, which may be otherwise isolated. The secure host subnet 1508 can communicate with the SSH subnet 1514 through an LPG 1510 that may enable two-way communication over an otherwise isolated system. Connecting the secure host subnet 1508 to the SSH subnet 1514 may give the secure host subnet 1508 access to other entities within the service tenancy 1519.

The control plane VCN 1516 may allow users of the service tenancy 1519 to set up or otherwise provision desired resources. Desired resources provisioned in the control plane VCN 1516 may be deployed or otherwise used in the data plane VCN 1518. In some examples, the control plane VCN 1516 can be isolated from the data plane VCN 1518, and the data plane mirror app tier 1540 of the control plane VCN 1516 can communicate with the data plane app tier 1546 of the data plane VCN 1518 via VNICs 1542 that can be contained in the data plane mirror app tier 1540 and the data plane app tier 1546.

In some examples, users of the system, or customers, can make requests, for example create, read, update, or delete (CRUD) operations, through public Internet 1554 that can communicate the requests to the metadata management service 1552. The metadata management service 1552 can communicate the request to the control plane VCN 1516 through the Internet gateway 1534. The request can be received by the LB subnet(s) 1522 contained in the control plane DMZ tier 1520. The LB subnet(s) 1522 may determine that the request is valid, and in response to this determination, the LB subnet(s) 1522 can transmit the request to app subnet(s) 1526 contained in the control plane app tier 1524. If the request is validated and requires a call to public Internet 1554, the call to public Internet 1554 may be transmitted to the NAT gateway 1538 that can make the call to public Internet 1554. Metadata that may be desired to be stored by the request can be stored in the DB subnet(s) 1530.

In some examples, the data plane mirror app tier 1540 can facilitate direct communication between the control plane VCN 1516 and the data plane VCN 1518. For example, changes, updates, or other suitable modifications to configuration may be desired to be applied to the resources contained in the data plane VCN 1518. Via a VNIC 1542, the control plane VCN 1516 can directly communicate with, and can thereby execute the changes, updates, or other suitable modifications to configuration to, resources contained in the data plane VCN 1518.

In some embodiments, the control plane VCN 1516 and the data plane VCN 1518 can be contained in the service tenancy 1519. In this case, the user, or the customer, of the system may not own or operate either the control plane VCN 1516 or the data plane VCN 1518. Instead, the IaaS provider may own or operate the control plane VCN 1516 and the data plane VCN 1518, both of which may be contained in the service tenancy 1519. This embodiment can enable isolation of networks that may prevent users or customers from interacting with other users, ' or other customers,' resources. Also, this embodiment may allow users or customers of the system to store databases privately without needing to rely on public Internet 1554, which may not have a desired level of threat prevention, for storage.

In other embodiments, the LB subnet(s) 1522 contained in the control plane VCN 1516 can be configured to receive a signal from the service gateway 1536. In this embodiment, the control plane VCN 1516 and the data plane VCN 1518 may be configured to be called by a customer of the IaaS provider without calling public Internet 1554. Customers of the IaaS provider may desire this embodiment since database(s) that the customers use may be controlled by the IaaS provider and may be stored on the service tenancy 1519, which may be isolated from public Internet 1554.

Figure 16:
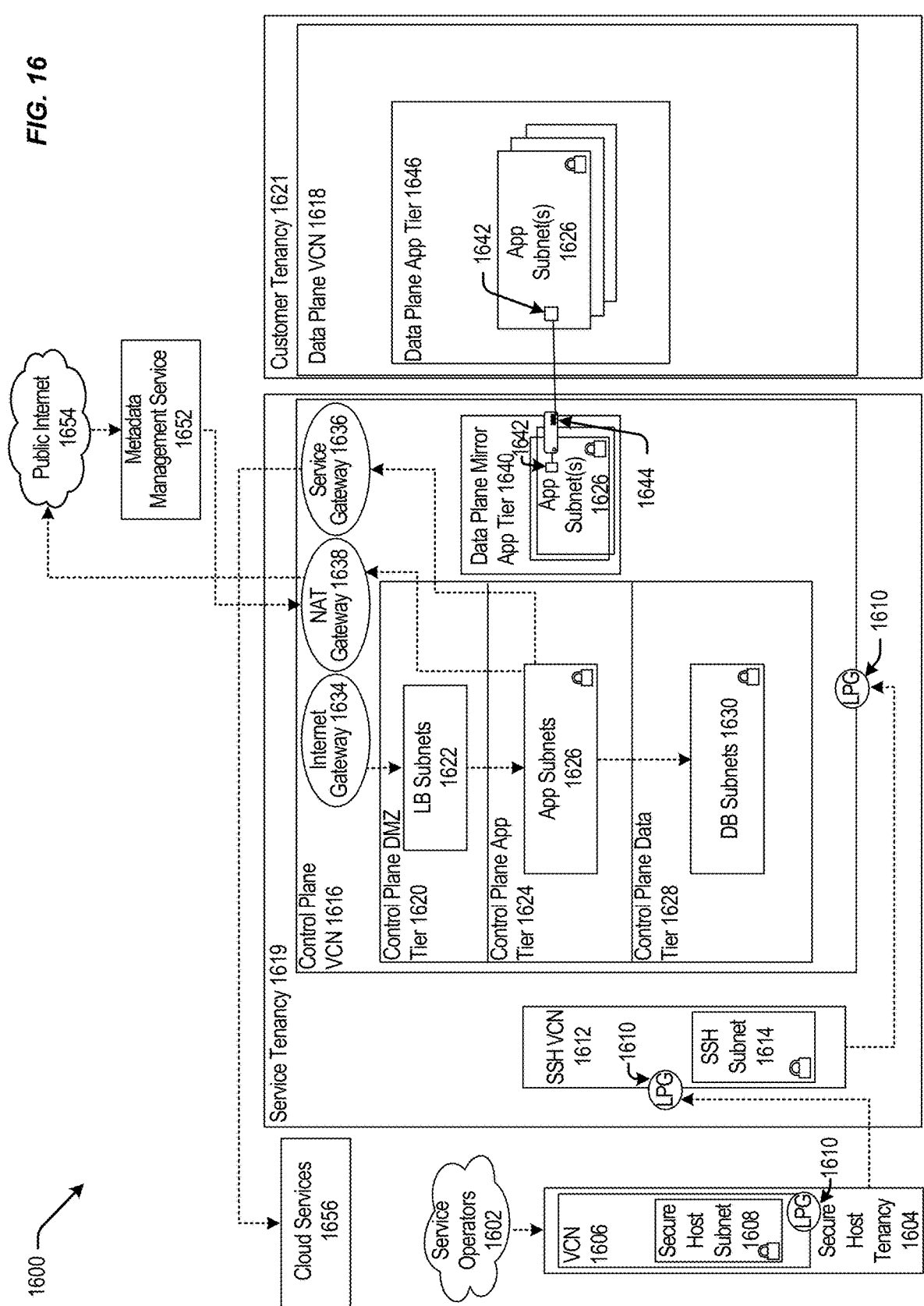
FIG. 16 is a block diagram illustrating another pattern for implementing a cloud infrastructure as a service system, according to certain embodiments.

FIG. 16 is a block diagram 1600 illustrating another example pattern of an IaaS architecture, according to at least one embodiment. Service operators 1602 (e.g., service operators 1502 of FIG. 15) can be communicatively coupled to a secure host tenancy 1604 (e.g., the secure host tenancy 1504 of FIG. 15) that can include a VCN 1606 (e.g., the VCN 1506 of FIG. 15) and a secure host subnet 1608 (e.g., the secure host subnet 1508 of FIG. 15). The VCN 1606 can include a local peering gateway (LPG) 1610 (e.g., the LPG 1510 of FIG. 15) that can be communicatively coupled to a secure shell (SSH) VCN 1612 (e.g., the SSH VCN 1512 of FIG. 15) via an LPG 1510 contained in the SSH VCN 1612. The SSH VCN 1612 can include an SSH subnet 1614 (e.g., the SSH subnet 1514 of FIG. 15), and the SSH VCN 1612 can be communicatively coupled to a control plane VCN 1616 (e.g., the control plane VCN 1516 of FIG. 15) via an LPG 1610 contained in the control plane VCN 1616. The control plane VCN 1616 can be contained in a service tenancy 1619 (e.g., the service tenancy 1519 of FIG. 15), and the data plane VCN 1618 (e.g., the data plane VCN 1518 of FIG. 15) can be contained in a customer tenancy 1621 that may be owned or operated by users, or customers, of the system.

The control plane VCN 1616 can include a control plane DMZ tier 1620 (e.g., the control plane DMZ tier 1520 of FIG. 15) that can include LB subnet(s) 1622 (e.g., LB subnet(s) 1522 of FIG. 15), a control plane app tier 1624 (e.g., the control plane app tier 1524 of FIG. 15) that can include app subnet(s) 1626 (e.g., app subnet(s) 1526 of FIG. 15), a control plane data tier 1628 (e.g., the control plane data tier 1528 of FIG. 15) that can include database (DB) subnet(s) 1630 (e.g., similar to DB subnet(s) 1530 of FIG. 15). The LB subnet(s) 1622 contained in the control plane DMZ tier 1620 can be communicatively coupled to the app subnet(s) 1626 contained in the control plane app tier 1624 and an Internet gateway 1634 (e.g., the Internet gateway

1534 of FIG. 15) that can be contained in the control plane VCN 1616, and the app subnet(s) 1626 can be communicatively coupled to the DB subnet(s) 1630 contained in the control plane data tier 1628 and a service gateway 1636 (e.g., the service gateway 1536 of FIG. 15) and a network address translation (NAT) gateway 1638 (e.g., the NAT gateway 1538 of FIG. 15). The control plane VCN 1616 can include the service gateway 1636 and the NAT gateway 1638.

The control plane VCN 1616 can include a data plane mirror app tier 1640 (e.g., the data plane mirror app tier 1540 of FIG. 15) that can include app subnet(s) 1626. The app subnet(s) 1626 contained in the data plane mirror app tier 1640 can include a virtual network interface controller (VNIC) 1642 (e.g., the VNIC of 1542) that can execute a compute instance 1644 (e.g., similar to the compute instance 1544 of FIG. 15). The compute instance 1644 can facilitate communication between the app subnet(s) 1626 of the data plane mirror app tier 1640 and the app subnet(s) 1626 that can be contained in a data plane app tier 1646 (e.g., the data plane app tier 1546 of FIG. 15) via the VNIC 1642 contained in the data plane mirror app tier 1640 and the VNIC 1642 contained in the data plane app tier 1646.

The Internet gateway 1634 contained in the control plane VCN 1616 can be communicatively coupled to a metadata management service 1652 (e.g., the metadata management service 1552 of FIG. 15) that can be communicatively coupled to public Internet 1654 (e.g., public Internet 1554 of FIG. 15). Public Internet 1654 can be communicatively coupled to the NAT gateway 1638 contained in the control plane VCN 1616. The service gateway 1636 contained in the control plane VCN 1616 can be communicatively coupled to cloud services 1656 (e.g., cloud services 1556 of FIG. 15).

In some examples, the data plane VCN 1618 can be contained in the customer tenancy 1621. In this case, the IaaS provider may provide the control plane VCN 1616 for each customer, and the IaaS provider may, for each customer, set up a unique compute instance 1644 that is contained in the service tenancy 1619. Each compute instance 1644 may allow communication between the control plane VCN 1616, contained in the service tenancy 1619, and the data plane VCN 1618 that is contained in the customer tenancy 1621. The compute instance 1644 may allow resources, that are provisioned in the control plane VCN 1616 that is contained in the service tenancy 1619, to be deployed or otherwise used in the data plane VCN 1618 that is contained in the customer tenancy 1621.

In other examples, the customer of the IaaS provider may have databases that live in the customer tenancy 1621. In this example, the control plane VCN 1616 can include the data plane mirror app tier 1640 that can include app subnet(s) 1626. The data plane mirror app tier 1640 can reside in the data plane VCN 1618, but the data plane mirror app tier 1640 may not live in the data plane VCN 1618. That is, the data plane mirror app tier 1640 may have access to the customer tenancy 1621, but the data plane mirror app tier 1640 may not exist in the data plane VCN 1618 or be owned or operated by the customer of the IaaS provider. The data plane mirror app tier 1640 may be configured to make calls to the data plane VCN 1618 but may not be configured to make calls to any entity contained in the control plane VCN 1616. The customer may desire to deploy or otherwise use resources in the data plane VCN 1618 that are provisioned in the control plane VCN 1616, and the data plane mirror app tier 1640 can facilitate the desired deployment, or other usage of resources, of the customer.

In some embodiments, the customer of the IaaS provider can apply filters to the data plane VCN 1618. In this embodiment, the customer can determine what the data plane VCN 1618 can access, and the customer may restrict access to public Internet 1654 from the data plane VCN 1618. The IaaS provider may not be able to apply filters or otherwise control access of the data plane VCN 1618 to any outside networks or databases. Applying filters and controls by the customer onto the data plane VCN 1618, contained in the customer tenancy 1621, can help isolate the data plane VCN 1618 from other customers and from public Internet 1654.

In some embodiments, cloud services 1656 can be called by the service gateway 1636 to access services that may not exist on public Internet 1654, on the control plane VCN 1616, or on the data plane VCN 1618. The connection between cloud services 1656 and the control plane VCN 1616 or the data plane VCN 1618 may not be live or continuous. Cloud services 1656 may exist on a different network owned or operated by the IaaS provider. Cloud services 1656 may be configured to receive calls from the service gateway 1636 and may be configured to not receive calls from public Internet 1654. Some cloud services 1656 may be isolated from other cloud services 1656, and the control plane VCN 1616 may be isolated from cloud services 1656 that may not be in the same region as the control plane VCN 1616. For example, the control plane VCN 1616 may be located in "Region 1," and cloud service "Deployment 19," may be located in Region 1 and in "Region 2." If a call to Deployment 19 is made by the service gateway 1636 contained in the control plane VCN 1616 located in Region 1, the call may be transmitted to Deployment 19 in Region 1. In this example, the control plane VCN 1616, or Deployment 19 in Region 1, may not be communicatively coupled to, or otherwise in communication with, Deployment 19 in Region 2.

Figure 17:
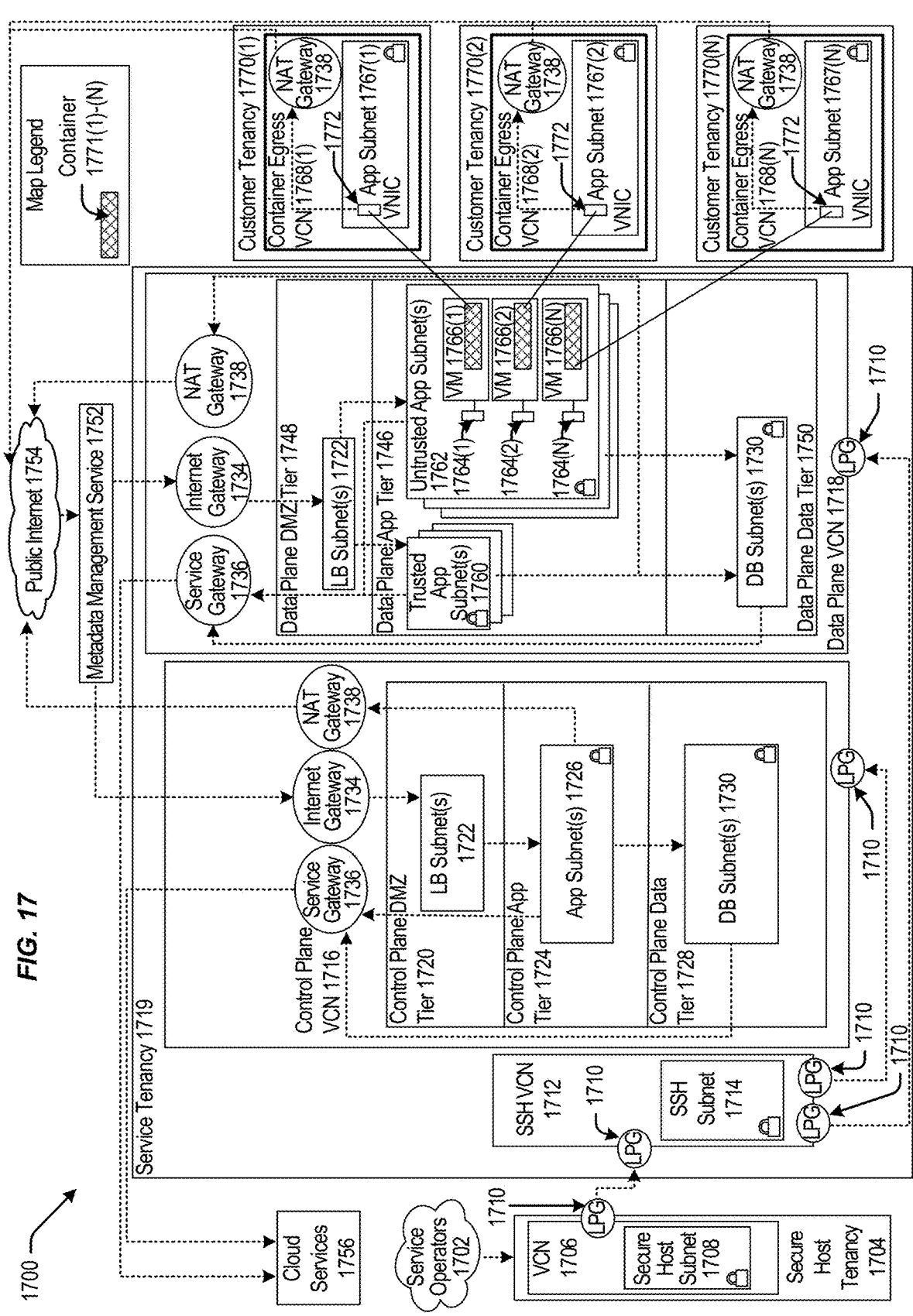
FIG. 17 is a block diagram illustrating another pattern for implementing a cloud infrastructure as a service system, according to certain embodiments.

FIG. 17 is a block diagram 1700 illustrating another example pattern of an IaaS architecture, according to at least one embodiment. Service operators 1702 (e.g., service operators 1502 of FIG. 15) can be communicatively coupled to a secure host tenancy 1704 (e.g., the secure host tenancy 1504 of FIG. 15) that can include a VCN 1706 (e.g., the VCN 1506 of FIG. 15) and a secure host subnet 1708 (e.g., the secure host subnet 1508 of FIG. 15). The VCN 1706 can include an LPG 1710 (e.g., the LPG 1510 of FIG. 15) that can be communicatively coupled to an SSH VCN 1712 (e.g., the SSH VCN 1512 of FIG. 15) via an LPG 1710 contained in the SSH VCN 1712. The SSH VCN 1712 can include an SSH subnet 1714 (e.g., the SSH subnet 1514 of FIG. 15), and the SSH VCN 1712 can be communicatively coupled to a control plane VCN 1716 (e.g., the control plane VCN 1516 of FIG. 15) via an LPG 1710 contained in the control plane VCN 1716 and to a data plane VCN 1718 (e.g., the data plane 1518 of FIG. 15) via an LPG 1710 contained in the data plane VCN 1718. The control plane VCN 1716 and the data plane VCN 1718 can be contained in a service tenancy 1719 (e.g., the service tenancy 1519 of FIG. 15).

The control plane VCN 1716 can include a control plane DMZ tier 1720 (e.g., the control plane DMZ tier 1520 of FIG. 15) that can include load balancer (LB) subnet(s) 1722 (e.g., LB subnet(s) 1522 of FIG. 15), a control plane app tier 1724 (e.g., the control plane app tier 1524 of FIG. 15) that can include app subnet(s) 1726 (e.g., similar to app subnet(s) 1526 of FIG. 15), a control plane data tier 1728 (e.g., the control plane data tier 1528 of FIG. 15) that can include DB subnet(s) 1730. The LB subnet(s) 1722 contained in the control plane DMZ tier 1720 can be communicatively coupled to the app subnet(s) 1726 contained in the control plane app tier 1724 and to an Internet gateway 1734 (e.g., the Internet gateway 1534 of FIG. 15) that can be contained in the control plane VCN 1716, and the app subnet(s) 1726 can be communicatively coupled to the DB subnet(s) 1730 contained in the control plane data tier 1728 and to a service gateway 1736 (e.g., the service gateway of FIG. 15) and a network address translation (NAT) gateway 1738 (e.g., the NAT gateway 1538 of FIG. 15). The control plane VCN 1716 can include the service gateway 1736 and the NAT gateway 1738.

The data plane VCN 1718 can include a data plane app tier 1746 (e.g., the data plane app tier 1546 of FIG. 15), a data plane DMZ tier 1748 (e.g., the data plane DMZ tier 1548 of FIG. 15), and a data plane data tier 1750 (e.g., the data plane data tier 1550 of FIG. 15). The data plane DMZ tier 1748 can include LB subnet(s) 1722 that can be communicatively coupled to trusted app subnet(s) 1760 and untrusted app subnet(s) 1762 of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include one or more primary VNICs 1764(1)-(N) that can be communicatively coupled to tenant virtual machines (VMs) 1766(1)-(N). Each tenant VM 1766(1)-(N) can be communicatively coupled to a respective app subnet 1767(1)-(N) that can be contained in respective container egress VCNs 1768(1)-(N) that can be contained in respective customer tenancies 1770(1)-(N). Respective secondary VNICs 1772(1)-(N) can facilitate communication between the untrusted app subnet(s) 1762 contained in the data plane VCN 1718 and the app subnet contained in the container egress VCNs 1768(1)-(N). Each container egress VCNs 1768(1)-(N) can include a NAT gateway 1738 that can be communicatively coupled to public Internet 1754 (e.g., public Internet 1554 of FIG. 15).

The Internet gateway 1734 contained in the control plane VCN 1716 and contained in the data plane VCN 1718 can be communicatively coupled to a metadata management service 1752 (e.g., the metadata management system 1552 of FIG. 15) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively coupled to cloud services 1756.

In some embodiments, the data plane VCN 1718 can be integrated with customer tenancies 1770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1746. Code to run the function may be executed in the VMs 1766(1)-(N), and the code may not be configured to run anywhere else on the data plane VCN 1718. Each VM 1766(1)-(N) may be connected to one customer tenancy 1770. Respective containers 1771(1)-(N) contained in the VMs 1766(1)-(N) may be configured to run the code. In this case, there can be a dual isolation (e.g., the containers 1771(1)-(N) running code, where the containers 1771(1)-(N) may be contained in at least the VM 1766(1)-(N) that are contained in the untrusted app subnet(s) 1762), which may help prevent incorrect or otherwise undesirable code from damaging the network of the IaaS provider or from damaging a network of a different customer. The containers 1771 (1)-(N) may be communicatively coupled to the customer tenancy 1770 and may be configured to transmit or receive data from the customer tenancy 1770. The containers 1771 (1)-(N) may not be configured to transmit or receive data from any other entity in the data plane VCN 1718. Upon completion of running the code, the IaaS provider may kill or otherwise dispose of the containers 1771(1)-(N).

In some embodiments, the trusted app subnet(s) 1760 may run code that may be owned or operated by the IaaS provider. In this embodiment, the trusted app subnet(s) 1760 may be communicatively coupled to the DB subnet(s) 1730 and be configured to execute CRUD operations in the DB subnet(s) 1730. The untrusted app subnet(s) 1762 may be communicatively coupled to the DB subnet(s) 1730, but in this embodiment, the untrusted app subnet(s) may be configured to execute read operations in the DB subnet(s) 1730. The containers 1771(1)-(N) that can be contained in the VM 1766(1)-(N) of each customer and that may run code from the customer may not be communicatively coupled with the DB subnet(s) 1730.

In other embodiments, the control plane VCN 1716 and the data plane VCN 1718 may not be directly communicatively coupled. In this embodiment, there may be no direct communication between the control plane VCN 1716 and the data plane VCN 1718. However, communication can occur indirectly through at least one method. An LPG 1710 may be established by the IaaS provider that can facilitate communication between the control plane VCN 1716 and the data plane VCN 1718. In another example, the control plane VCN 1716 or the data plane VCN 1718 can make a call to cloud services 1756 via the service gateway 1736. For example, a call to cloud services 1756 from the control plane VCN 1716 can include a request for a service that can communicate with the data plane VCN 1718.

Figure 18:
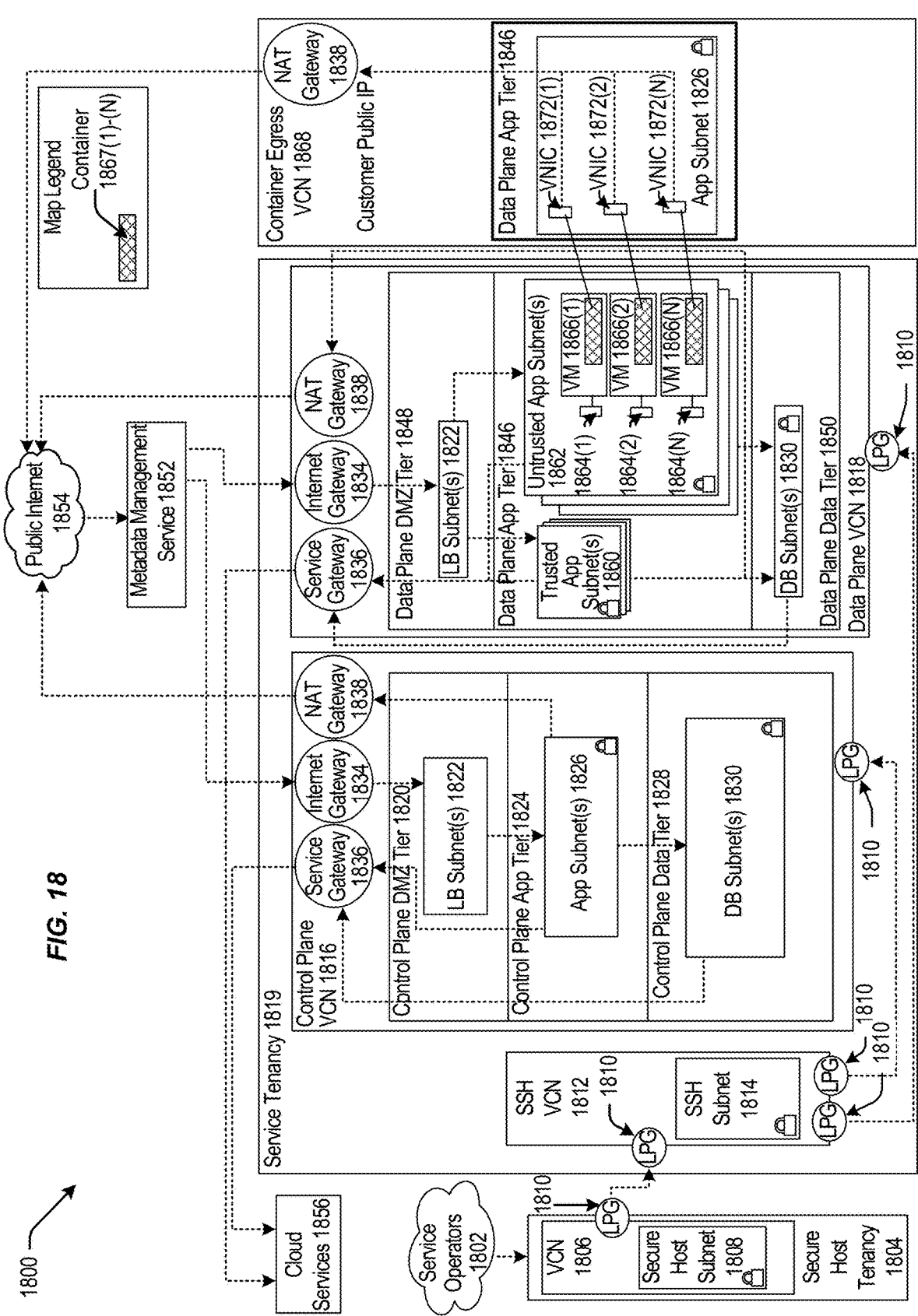
FIG. 18 is a block diagram illustrating another pattern for implementing a cloud infrastructure as a service system, according to certain embodiments.

FIG. 18 is a block diagram 1800 illustrating another example pattern of an IaaS architecture, according to at least one embodiment. Service operators 1802 (e.g., service operators 1502 of FIG. 15) can be communicatively coupled to a secure host tenancy 1804 (e.g., the secure host tenancy 1504 of FIG. 15) that can include a VCN 1806 (e.g., the VCN 1506 of FIG. 15) and a secure host subnet 1808 (e.g., the secure host subnet 1508 of FIG. 15). The VCN 1806 can include an LPG 1810 (e.g., the LPG 1510 of FIG. 15) that can be communicatively coupled to an SSH VCN 1812 (e.g., the SSH VCN 1512 of FIG. 15) via an LPG 1810 contained in the SSH VCN 1812. The SSH VCN 1812 can include an SSH subnet 1814 (e.g., the SSH subnet 1514 of FIG. 15), and the SSH VCN 1812 can be communicatively coupled to a control plane VCN 1816 (e.g., the control plane VCN 1516 of FIG. 15) via an LPG 1810 contained in the control plane VCN 1816 and to a data plane VCN 1818 (e.g., the data plane 1518 of FIG. 15) via an LPG 1810 contained in the data plane VCN 1818. The control plane VCN 1816 and the data plane VCN 1818 can be contained in a service tenancy 1819 (e.g., the service tenancy 1519 of FIG. 15).

The control plane VCN 1816 can include a control plane DMZ tier 1820 (e.g., the control plane DMZ tier 1520 of FIG. 15) that can include LB subnet(s) 1822 (e.g., LB subnet(s) 1522 of FIG. 15), a control plane app tier 1824 (e.g., the control plane app tier 1524 of FIG. 15) that can include app subnet(s) 1826 (e.g., app subnet(s) 1526 of FIG. 15), a control plane data tier 1828 (e.g., the control plane data tier 1528 of FIG. 15) that can include DB subnet(s) 1830 (e.g., DB subnet(s) 1730 of FIG. 17). The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1534 of FIG. 15) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 15) and a network address translation (NAT) gateway 1838 (e.g., the NAT gateway 1538 of FIG. 15). The control plane VCN 1816 can include the service gateway 1836 and the NAT gateway 1838.

The data plane VCN 1818 can include a data plane app tier 1846 (e.g., the data plane app tier 1546 of FIG. 15), a data plane DMZ tier 1848 (e.g., the data plane DMZ tier 1548 of FIG. 15), and a data plane data tier 1850 (e.g., the data plane data tier 1550 of FIG. 15). The data plane DMZ tier 1848 can include LB subnet(s) 1822 that can be communicatively coupled to trusted app subnet(s) 1860 (e.g., trusted app subnet(s) 1760 of FIG. 17) and untrusted app subnet(s) 1862 (e.g., untrusted app subnet(s) 1762 of FIG. 17) of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include primary VNICs 1864(1)-(N) that can be communicatively coupled to tenant virtual machines (VMs) 1866(1)-(N) residing within the untrusted app subnet(s) 1862. Each tenant VM 1866(1)-(N) can run code in a respective container 1867(1)-(N), and be communicatively coupled to an app subnet 1826 that can be contained in a data plane app tier 1846 that can be contained in a container egress VCN 1868. Respective secondary VNICs 1872(1)-(N) can facilitate communication between the untrusted app subnet(s) 1862 contained in the data plane VCN 1818 and the app subnet contained in the container egress VCN 1868. The container egress VCN can include a NAT gateway 1838 that can be communicatively coupled to public Internet 1854 (e.g., public Internet 54 of FIG. 15).

The Internet gateway 1834 contained in the control plane VCN 1816 and contained in the data plane VCN 1818 can be communicatively coupled to a metadata management service 1852 (e.g., the metadata management system 1552 of FIG. 15) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively coupled to cloud services 1856.

In some examples, the pattern illustrated by the architecture of block diagram 1800 of FIG. 18 may be considered an exception to the pattern illustrated by the architecture of block diagram 1700 of FIG. 17 and may be desirable for a customer of the IaaS provider if the IaaS provider cannot directly communicate with the customer (e.g., a disconnected region). The respective containers 1867(1)-(N) that are contained in the VMs 1866(1)-(N) for each customer can be accessed in real-time by the customer. The containers 1867(1)-(N) may be configured to make calls to respective secondary VNICs 1872(1)-(N) contained in app subnet(s) 1826 of the data plane app tier 1846 that can be contained in the container egress VCN 1868. The secondary VNICs 1872(1)-(N) can transmit the calls to the NAT gateway 1838 that may transmit the calls to public Internet 1854. In this example, the containers 1867(1)-(N) that can be accessed in real-time by the customer can be isolated from the control plane VCN 1816 and can be isolated from other entities contained in the data plane VCN 1818. The containers 1867(1)-(N) may also be isolated from resources from other customers.

In other examples, the customer can use the containers 1867(1)-(N) to call cloud services 1856. In this example, the customer may run code in the containers 1867(1)-(N) that requests a service from cloud services 1856. The containers 1867(1)-(N) can transmit this request to the secondary VNICs 1872(1)-(N) that can transmit the request to the NAT gateway that can transmit the request to public Internet 1854. Public Internet 1854 can transmit the request to LB subnet(s) 1822 contained in the control plane VCN 1816 via the Internet gateway 1834. In response to determining the request is valid, the LB subnet(s) can transmit the request to app subnet(s) 1826 that can transmit the request to cloud services 1856 via the service gateway 1836.

It should be appreciated that IaaS architectures 1500, 1600, 1700, 1800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 19:
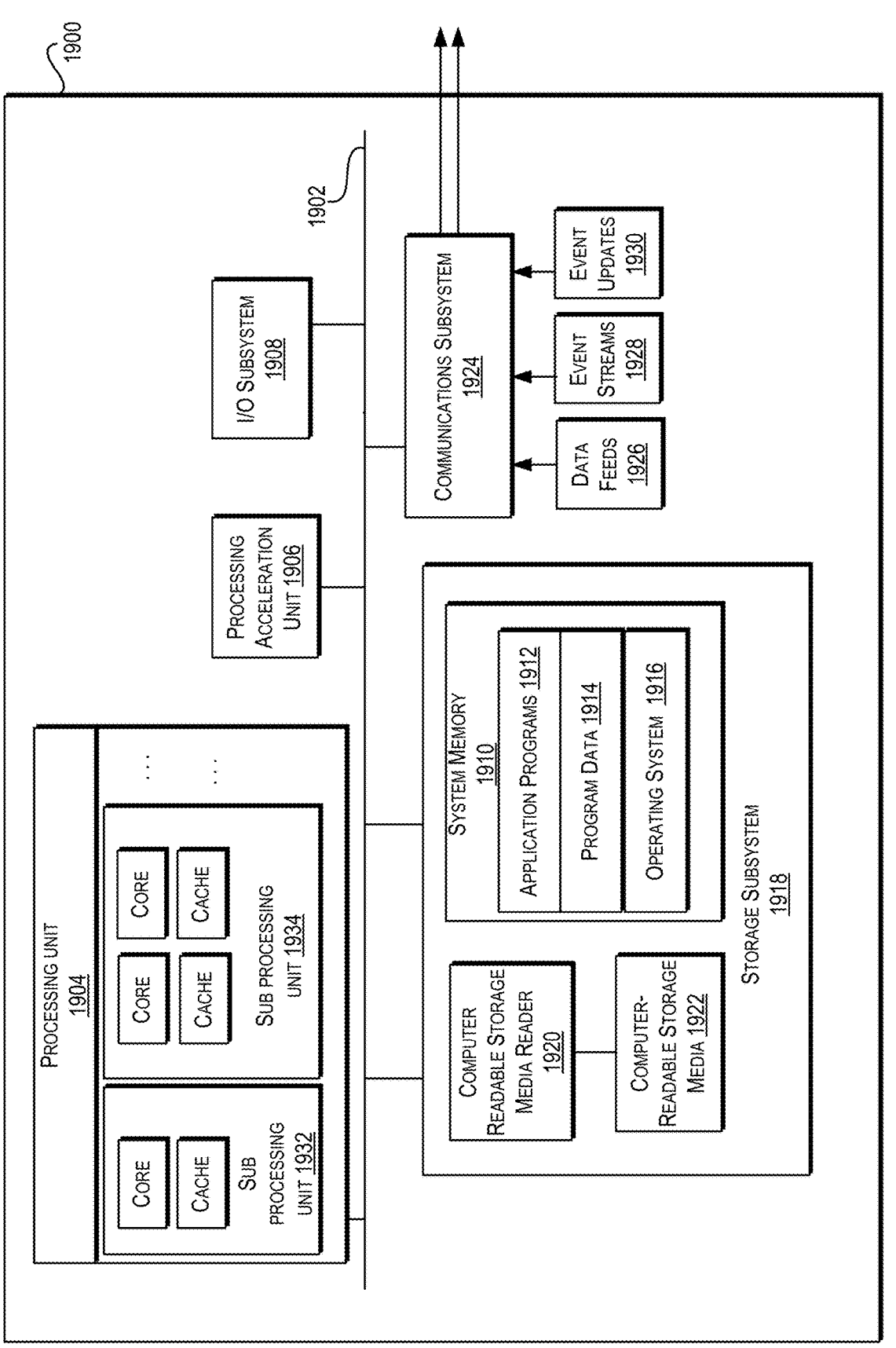
FIG. 19 is a block diagram illustrating an example computer system, according to certain embodiments.

FIG. 19 illustrates an example computer system 1900, in which various embodiments may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 1900 may comprise a storage subsystem 1918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1904 provide the functionality described above. Storage subsystem 1918 may also provide a repository for storing data used in accordance with the present disclosure.

As depicted in the example in FIG. 19, storage subsystem 1918 can include various components including a system memory 1910, computer-readable storage media 1922, and a computer readable storage media reader 1920. System memory 1910 may store program instructions that are loadable and executable by processing unit 1904. System memory 1910 may also store data that is used during the execution of the instructions and/or data that is generated during the execution of the program instructions. Various different kinds of programs may be loaded into system memory 1910 including but not limited to client applications, Web browsers, mid-tier applications, relational database management systems (RDBMS), virtual machines, containers, etc.

System memory 1910 may also store an operating system 1916. Examples of operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1900 executes one or more virtual machines, the virtual machines along with their guest operating systems (GOSs) may be loaded into system memory 1910 and executed by one or more processors or cores of processing unit 1904.

System memory 1910 can come in different configurations depending upon the type of computer system 1900. For example, system memory 1910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1910 may include a basic input/output system (BIOS) containing basic routines that help to transfer information between elements within computer system 1900, such as during start-up.

Computer-readable storage media 1922 may represent remote, local, fixed, and/or removable storage devices plus storage media for temporarily and/or more permanently containing, storing, computer-readable information for use by computer system 1900 including instructions executable by processing unit 1904 of computer system 1900.

Computer-readable storage media 1922 can include any appropriate media known or used in the art, including storage media and communication media, such as but not limited to, volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Machine-readable instructions executable by one or more processors or cores of processing unit 1904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system comprising:
a first cloud service provider infrastructure comprising first computing resources of a first cloud service provider that are deployed within a first data center of the first cloud service provider infrastructure, wherein the first cloud service provider infrastructure comprises a first infrastructure and a second infrastructure, wherein:
the first infrastructure is physically connected to a third infrastructure of a second cloud service provider infrastructure based on a first protocol, wherein the second cloud service provider infrastructure comprises second computing resources of the first cloud service provider and third computing resources of a second cloud service provider; and
the first infrastructure is physically connected to the second infrastructure based on a second protocol that is different from the first protocol.

2. The system of claim 1, wherein the first cloud service provider infrastructure further comprises a first connectivity fabric, and wherein the first connectivity fabric is physically connected to a second connectivity fabric of the second cloud service provider infrastructure such that data connectivity exists between the first infrastructure and the third infrastructure.

3. The system of claim 1, wherein a private cloud is hosted between the first infrastructure and the third infrastructure.

4. The system of claim 3, wherein the private cloud is a private cloud for a customer of a cloud service provider providing the first cloud service provider infrastructure.

5. The system of claim 3, wherein the private cloud is a first private cloud, and wherein a second private cloud is hosted between the first infrastructure and the second infrastructure.

6. The system of claim 5, wherein the second private cloud is a private cloud for a customer of a cloud service provider providing the first cloud service provider infrastructure.

7. The system of claim 5, wherein a first private cloud is interconnected to the second private cloud based on a physical connection between the first infrastructure and the second infrastructure, the first protocol, a physical connection between the first infrastructure and the third infrastructure, and the second protocol.

8. The system of claim 5, wherein the first private cloud utilizes computing resources provided by the first infrastructure and the third infrastructure.

9. The system of claim 5, wherein the second private cloud utilizes computing resources provided by the first infrastructure and the second infrastructure.

10. The system of claim 5, wherein the first private cloud is provided based at least in-part on executing services using one or more processors included in the first infrastructure.

11. The system of claim 1, wherein the first infrastructure comprises a first set of routers and the second infrastructure comprises a second set of routers, wherein the first set of routers are interconnected with the second set of routers.

12. The system of claim 11, wherein the first set of routers are interconnected with the second set of routers based on the first protocol.

13. The system of claim 1, wherein the first cloud service provider infrastructure is provided by a first cloud service provider and the second cloud service provider infrastructure is provided by a second cloud service provider that is different from the first cloud service provider.

14. The system of claim 13, wherein the first infrastructure and the second infrastructure are configured to provide a cross-cloud service of the second cloud service provider to a customer having a tenancy with the first cloud service provider.

15. The system of claim 1, wherein the first cloud service provider infrastructure is provided by a first cloud service provider and comprises a set of computing resources that support cross-cloud services provided by a second cloud service provider providing the second cloud service provider infrastructure.

16. The system of claim 15, wherein the first protocol is a protocol supported by the second cloud service provider.

17. The system of claim 15, wherein the second protocol is a protocol supported by the first cloud service provider.

18. The system of claim 1, wherein the first infrastructure hosts a virtual machine cluster for a cross-cloud service provided by a second cloud service provider providing the second cloud service provider infrastructure.

19. The system of claim 1, wherein the first infrastructure supports a private cloud, and wherein the first infrastructure supports the private cloud based at least in part on a mapping of first subnets that are associated with the first infrastructure to second subnets associated with the third infrastructure.

20. The system of claim 19, wherein Internet Protocol (IP) addresses of the first subnets are within a Classless Inter-Domain Routing (CIDR) IP range of IP addresses of the second subnets.

* * * * *